US011168772B2

(12) United States Patent
Mathers

(10) Patent No.: US 11,168,772 B2
(45) Date of Patent: *Nov. 9, 2021

(54) HYDROSTATIC TORQUE CONVERTER AND TORQUE AMPLIFIER

(71) Applicant: Mathers Hydraulics Technologies Pty Ltd, Bridgeman Downs (AU)

(72) Inventor: Norman Ian Mathers, Brisbane (AU)

(73) Assignee: Mathers Hydraulics Technologies Pty Ltd, Bridgeman Downs (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,943

(22) Filed: May 6, 2020

(65) Prior Publication Data

US 2020/0332871 A1     Oct. 22, 2020

Related U.S. Application Data

(63) Continuation of application No. 15/835,058, filed on Dec. 7, 2017, now Pat. No. 10,670,125, which is a
(Continued)

(51) Int. Cl.
| | |
|---|---|
| *F16H 39/04* | (2006.01) |
| *F16H 61/52* | (2006.01) |
| *F16H 61/452* | (2010.01) |
| *B60K 6/12* | (2006.01) |
| *F16H 39/32* | (2006.01) |

(Continued)

(52) U.S. Cl.
CPC .............. *F16H 39/04* (2013.01); *B60K 6/12* (2013.01); *F16D 33/00* (2013.01); *F16H 39/32* (2013.01); *F16H 61/40* (2013.01); *F16H 61/452* (2013.01); *F16H 61/52* (2013.01); *Y02T 10/62* (2013.01)

(58) Field of Classification Search
CPC .. F16H 39/32; F16H 61/4096; F16H 61/4104; F16H 61/48; F16H 61/52; F16D 33/00; F16D 33/04
See application file for complete search history.

(56) References Cited

U.S. PATENT DOCUMENTS

| | | |
|---|---|---|
| 983,754 A | 2/1911 | Nichols |
| 2,003,615 A | 6/1935 | Charles et al. |

(Continued)

FOREIGN PATENT DOCUMENTS

| | | |
|---|---|---|
| AU | 2010320606 B2 | 2/2017 |
| AU | 2017202300 B2 | 10/2018 |

(Continued)

OTHER PUBLICATIONS

"U.S. Appl. No. 11/914,203, Notice of Allowance dated Feb. 1, 2011", 12 pgs.

(Continued)

*Primary Examiner* — Michael Leslie
(74) *Attorney, Agent, or Firm* — Schwegman Lundberg & Woessner, P.A.

(57) ABSTRACT

An example includes a hydraulically controllable coupling to couple a rotating input and to an output to rotate, or to decouple the input and the output, with coupling and decoupling modes selected by switching a hydraulic device such as a vane pump between a pumping mode and a mode in which it does not pump. In an example, the system cooperates with a transmission to increase the number of possible gear ratios in some examples.

20 Claims, 26 Drawing Sheets

Related U.S. Application Data continuation of application No. 14/599,746, filed on Jan. 19, 2015, now Pat. No. 9,874,270, which is a continuation of application No. 13/510,643, filed as application No. PCT/IB2010/003161 on Nov. 19, 2010, now Pat. No. 9,400,043.

(60) Provisional application No. 61/263,304, filed on Nov. 20, 2009, provisional application No. 61/263,295, filed on Nov. 20, 2009.

(51) Int. Cl.
*F16D 33/00* (2006.01)
*F16H 61/40* (2010.01)

(56) References Cited

U.S. PATENT DOCUMENTS

| | | |
|---|---|---|
| 2,570,411 A | 10/1951 | Vickers |
| 2,612,110 A | 9/1952 | Delegard |
| 2,696,790 A | 12/1954 | Crow |
| 2,919,651 A | 1/1960 | Gardiner |
| 2,962,972 A | 12/1960 | Meter |
| 2,962,973 A | 12/1960 | Bruce |
| 2,967,488 A | 1/1961 | Gardiner |
| 2,982,223 A | 5/1961 | Rosaen et al. |
| 2,985,467 A | 5/1961 | Cable Jr. et al. |
| 3,035,554 A | 5/1962 | Selzler |
| 3,042,163 A | 7/1962 | Lapsley |
| 3,102,494 A | 9/1963 | Adams et al. |
| 3,120,154 A | 2/1964 | Gilreath |
| 3,149,845 A | 9/1964 | Knox |
| 3,160,147 A | 12/1964 | Hanson et al. |
| 3,208,570 A | 9/1965 | Aschauer |
| 3,223,044 A | 12/1965 | Adams et al. |
| 3,254,606 A | 6/1966 | Rosaen |
| 3,320,897 A | 5/1967 | Eickmann |
| 3,362,340 A | 1/1968 | Adams |
| 3,401,641 A | 9/1968 | Adams et al. |
| 3,407,742 A | 10/1968 | Mitchell et al. |
| 3,421,413 A | 1/1969 | Adams et al. |
| 3,451,346 A | 6/1969 | Pettibone et al. |
| 3,525,219 A | 8/1970 | Minchokovich |
| 3,533,493 A | 10/1970 | Braun |
| 3,578,888 A | 5/1971 | Adams |
| 3,586,466 A | 6/1971 | Erickson |
| 3,597,998 A | 8/1971 | Ebert |
| 3,640,651 A | 2/1972 | Johnson |
| 3,790,314 A | 2/1974 | Swain et al. |
| 3,792,585 A | 2/1974 | Eisenmann et al. |
| 3,895,565 A | 7/1975 | Schottler |
| 3,929,356 A | 12/1975 | Devincent et al. |
| 3,944,263 A | 3/1976 | Arnold |
| 4,037,409 A | 7/1977 | Leibach |
| 4,132,512 A | 1/1979 | Roberts |
| 4,248,309 A | 2/1981 | Hofle et al. |
| 4,260,343 A | 4/1981 | Watanabe et al. |
| 4,272,227 A | 6/1981 | Woodruff et al. |
| 4,274,010 A | 6/1981 | Lawson-Tancred |
| 4,350,220 A | 9/1982 | Carman |
| 4,354,809 A | 10/1982 | Sundberg et al. |
| 4,406,599 A | 9/1983 | Stephan |
| 4,412,789 A | 11/1983 | Ohe et al. |
| 4,431,389 A | 2/1984 | Johnson |
| 4,441,573 A | 4/1984 | Carman et al. |
| 4,472,119 A | 9/1984 | Roberts |
| 4,505,654 A | 3/1985 | Dean, Jr. et al. |
| 4,516,919 A | 5/1985 | Roberts |
| 4,629,406 A | 12/1986 | Tantardini |
| 4,646,521 A | 3/1987 | Snyder |
| 4,659,297 A | 4/1987 | Kahrs |
| 4,674,280 A | 6/1987 | Stuhr |
| 4,861,235 A | 8/1989 | Nakajima et al. |
| 4,913,636 A | 4/1990 | Niemiec et al. |
| 5,029,461 A | 7/1991 | Lawrence et al. |
| 5,064,362 A | 11/1991 | Hansen et al. |
| 5,170,636 A | 12/1992 | Hitosugi |
| 5,385,458 A | 1/1995 | Chu |
| 5,509,793 A | 4/1996 | Cherry |
| 5,551,484 A | 9/1996 | Charboneau |
| 5,655,369 A | 8/1997 | Folsom et al. |
| 5,657,629 A | 8/1997 | Folsom et al. |
| 5,733,109 A | 3/1998 | Sundberg et al. |
| 5,904,043 A | 5/1999 | Nagatomo |
| 6,015,278 A | 1/2000 | Key et al. |
| 6,056,329 A | 5/2000 | Kitani et al. |
| 6,135,742 A | 10/2000 | Cho et al. |
| 6,634,865 B2 | 10/2003 | Dalton |
| 6,817,438 B2 | 11/2004 | Modrzejewski et al. |
| 7,070,399 B2 | 7/2006 | Konishi et al. |
| 7,083,394 B2 | 8/2006 | Dalton |
| 7,094,044 B2 | 8/2006 | Strueh |
| 7,686,602 B1 | 3/2010 | Landhuis |
| 7,914,411 B2 | 3/2011 | Basteck |
| 7,955,062 B2 | 6/2011 | Mathers |
| 8,535,030 B2 | 9/2013 | Chua et al. |
| 8,584,452 B2 | 11/2013 | Lloyd et al. |
| 8,597,002 B2 | 12/2013 | Mathers |
| 8,691,063 B2 | 4/2014 | Aleksandrov |
| 8,708,679 B2 | 4/2014 | Mathers |
| 9,400,043 B2 | 7/2016 | Mathers et al. |
| 9,638,188 B2 | 5/2017 | Mathers |
| 9,874,270 B2 | 1/2018 | Mathers |
| 10,428,798 B2 | 10/2019 | Mathers |
| 10,487,657 B2 | 11/2019 | Mathers et al. |
| 10,670,125 B2 | 6/2020 | Mathers et al. |
| 10,774,966 B2 | 9/2020 | Mathers |
| 10,788,112 B2 | 9/2020 | Mathers et al. |
| 2004/0047741 A1 | 3/2004 | William |
| 2004/0136853 A1 | 7/2004 | Clements et al. |
| 2004/0219046 A1 | 11/2004 | Johnson et al. |
| 2006/0133946 A1 | 6/2006 | Mathers |
| 2008/0310988 A1 | 12/2008 | Mathers |
| 2009/0280021 A1 | 11/2009 | Mathers |
| 2010/0028181 A1 | 2/2010 | Mathers |
| 2010/0028641 A1 | 2/2010 | Zhu et al. |
| 2010/0154402 A1 | 6/2010 | Cho |
| 2010/0244447 A1 | 9/2010 | Gopalswamy et al. |
| 2013/0067899 A1 | 3/2013 | Mathers |
| 2014/0138958 A1 | 5/2014 | Verdegem |
| 2014/0291045 A1 | 10/2014 | Collett et al. |
| 2014/0328709 A1 | 11/2014 | Mathers |
| 2015/0128581 A1 | 5/2015 | Mathers |
| 2015/0184641 A1 | 7/2015 | Crane et al. |
| 2015/0338003 A1 | 11/2015 | Saito et al. |
| 2016/0178104 A1 | 6/2016 | Queau et al. |
| 2016/0194959 A1 | 7/2016 | Pekrul |
| 2018/0010676 A1 | 1/2018 | Mathers et al. |
| 2018/0023738 A1 | 1/2018 | Mathers |
| 2018/0094712 A1 | 4/2018 | Mathers |
| 2018/0106152 A1 | 4/2018 | Mathers et al. |
| 2018/0298881 A1 | 10/2018 | Mathers |
| 2020/0011180 A1 | 1/2020 | Mathers |
| 2020/0270992 A1 | 8/2020 | Mathers |

FOREIGN PATENT DOCUMENTS

| | | |
|---|---|---|
| AU | 2019200036 B2 | 6/2020 |
| CN | 1186173 A | 7/1998 |
| CN | 1833901 A | 9/2006 |
| CN | 1853031 A | 10/2006 |
| CN | 2924153 Y | 7/2007 |
| CN | 101081596 A | 12/2007 |
| CN | 101233297 A | 7/2008 |
| CN | 101490420 A | 7/2009 |
| CN | 101233297 B | 9/2010 |
| CN | 102562208 A | 7/2012 |
| CN | 102753851 A | 7/2012 |
| CN | 103052796 A | 4/2013 |
| CN | 103510988 A | 1/2014 |
| CN | 103511219 A | 1/2014 |
| CN | 103758976 A | 4/2014 |
| CN | 10836093 A | 6/2014 |
| CN | 104471251 A | 3/2015 |

(56) References Cited

FOREIGN PATENT DOCUMENTS

| | | |
|---|---|---|
| CN | 102753851 B | 8/2016 |
| CN | 106090065 A | 11/2016 |
| CN | 107428241 A | 12/2017 |
| CN | 107709704 A | 2/2018 |
| CN | 108431406 A | 8/2018 |
| CN | 108848674 A | 11/2018 |
| CN | 106090065 B | 3/2019 |
| CN | 110023667 A | 7/2019 |
| CN | 110382822 A | 10/2019 |
| DE | 1653801 A1 | 6/1971 |
| DE | 1728268 A1 | 3/1972 |
| DE | 2165530 A1 | 7/1973 |
| DE | 4136151 A1 | 5/1993 |
| DE | 19829726 A1 | 1/2000 |
| DE | 102012013152 A1 | 10/2006 |
| DE | 112007001338 T5 | 4/2009 |
| DE | 102011082725 A1 | 3/2013 |
| EP | 0051192 A1 | 5/1982 |
| EP | 0087401 A1 | 8/1983 |
| EP | 0399387 A2 | 11/1990 |
| EP | 0399387 B1 | 9/1992 |
| EP | 0384335 A1 | 5/1993 |
| EP | 1536138 A1 | 6/2005 |
| EP | 1779903 B1 | 3/2010 |
| EP | 1660756 B1 | 5/2018 |
| EP | 3365555 B1 | 9/2019 |
| EP | 2501950 B1 | 5/2020 |
| FR | 2944071 A3 | 10/2010 |
| GB | 1513208 A | 6/1978 |
| GB | 2015084 A | 9/1979 |
| GB | 2042642 A | 9/1980 |
| GB | 2176537 A | 12/1986 |
| IN | 5265DELNP2012 A1 | 8/2016 |
| IN | 201717028529 A | 10/2017 |
| IN | 201717036365 A | 12/2017 |
| IN | 201817018393 A | 9/2018 |
| IN | 201817026903 A | 11/2018 |
| IN | 201917006576 A | 5/2019 |
| IN | 201917036435 A | 11/2019 |
| JP | S5322204 U | 2/1978 |
| JP | S55112085 U | 8/1980 |
| JP | 2002275979 A | 9/2002 |
| JP | 2003172272 A | 6/2003 |
| JP | 2005351117 A | 12/2005 |
| JP | 2009539006 A | 11/2009 |
| JP | 5200009 A | 2/2013 |
| WO | WO-1981001444 A1 | 5/1981 |
| WO | WO-199401179 A1 | 1/1994 |
| WO | WO-9508047 A1 | 3/1995 |
| WO | WO-0204812 A1 | 1/2002 |
| WO | WO-2004000951 A1 | 12/2003 |
| WO | WO-2005005782 A1 | 1/2005 |
| WO | WO-2006119574 A1 | 11/2006 |
| WO | WO-2007140514 A1 | 12/2007 |
| WO | WO-2011011682 A2 | 1/2011 |
| WO | WO-2011061630 A2 | 5/2011 |
| WO | WO-2012015850 A1 | 2/2012 |
| WO | WO-2013140305 A1 | 9/2013 |
| WO | WO-2015123784 A1 | 8/2015 |
| WO | WO-2016065392 A1 | 5/2016 |
| WO | WO-2016116809 A1 | 7/2016 |
| WO | WO-2016149740 A1 | 9/2016 |
| WO | WO-2017066826 A1 | 4/2017 |
| WO | WO2017106909 A1 | 6/2017 |
| WO | WO-2018014082 A1 | 1/2018 |
| WO | WO-2018161108 A1 | 9/2018 |

OTHER PUBLICATIONS

"U.S. Appl. No. 11/914,203, Preliminary Amendment filed Nov. 12, 2007", 8 pgs.

"U.S. Appl. No. 11/914,203, Response filed Nov. 29, 2010 to Restriction Requirement dated Nov. 4, 2010", 8 pgs.

"U.S. Appl. No. 11/914,203, Restriction Requirement dated Nov. 4, 2010", 7 pgs.

"U.S. Appl. No. 12/303,224 , Response filed Feb. 13, 2013 to Final Office Action dated Sep. 13, 2012", 11 pgs.

"U.S. Appl. No. 12/303,224, Final Office Action dated Sep. 13, 2012", 14 pgs.

"U.S. Appl. No. 12/303,224, Non Final Office Action dated Jan. 19, 2012", 10 pgs.

"U.S. Appl. No. 12/303,224, Notice of Allowance dated Nov. 12, 2013", 15 pgs.

"U.S. Appl. No. 12/303,224, Preliminary Amendment filed Jun. 30, 2010", 4 pgs.

"U.S. Appl. No. 12/303,224, Preliminary Amendment filed Dec. 2, 2008", 5 pgs.

"U.S. Appl. No. 12/303,224, PTO Response to 312 Communication dated Apr. 1, 2014", 2 pgs.

"U.S. Appl. No. 12/303,224, Response filed May 18, 2012 to Non Final Office Action dated Jan. 19, 2012", 8 pgs.

"U.S. Appl. No. 12/303,224, Response filed Oct. 26, 2011 to Restriction Requirement dated Oct. 5, 2011", 3 pgs.

"U.S. Appl. No. 12/303,224, Restriction Requirement dated Oct. 5, 2011", 7 pgs.

"U.S. Appl. No. 12/466,280, Non Final Office Action dated Aug. 22, 2012", 18 pgs.

"U.S. Appl. No. 12/466,280, Notice of Allowance dated Apr. 29, 2013", 13 pgs.

"U.S. Appl. No. 12/466,280, PTO Response to 312 Amendment dated Jul. 25, 2013", 2 pgs.

"U.S. Appl. No. 12/466,280, PTO Response to 312 Amendment dated Oct. 31, 2013", 2 pgs.

"U.S. Appl. No. 12/466,280, Response filed Feb. 22, 2013 to Non Final Office Action dated Aug. 22, 2012", 16 pgs.

"U.S. Appl. No. 12/466,280, Response filed Jun. 28, 2012 to Restriction Requirement dated May 30, 2012", 9 pgs.

"U.S. Appl. No. 12/466,280, Restriction Requirement dated May 30, 2012", 6 pgs.

"U.S. Appl. No. 13/510,643, Non Final Office Action dated Aug. 13, 2015", 9 pgs.

"U.S. Appl. No. 13/510,643, Notice of Allowance dated Mar. 23, 2016", 7 pgs.

"U.S. Appl. No. 13/510,643, Preliminary Amendment May 17, 2012", 7 pgs.

"U.S. Appl. No. 13/510,643, Response filed Feb. 15, 2016 to Non Final Office Action dated Aug. 13, 2015", 11 pgs.

"U.S. Appl. No. 14/095,654, Examiner Interview Summary dated Sep. 6, 2016", 3 pgs.

"U.S. Appl. No. 14/095,654, Examiner Interview Summary dated Nov. 23, 2015", 3 pgs.

"U.S. Appl. No. 14/095,654, Final Office Action dated Jul. 8, 2016", 10 pgs.

"U.S. Appl. No. 14/095,654, Final Office Action dated Oct. 19, 2015", 24 pgs.

"U.S. Appl. No. 14/095,654, Non Final Office Action dated 02-11, 2016", 17 pgs.

"U.S. Appl. No. 14/095,654, Non Final Office Action dated Nov. 6, 2014", 14 pgs.

"U.S. Appl. No. 14/095,654, Notice of Allowance dated Sep. 26, 2016", 5 pgs.

"U.S. Appl. No. 14/095,654, PTO Response to Rule 312 Communication dated Apr. 5, 2017", 2 pgs.

"U.S. Appl. No. 14/095,654, Response filed Jan. 19, 2016 to Final Office Action dated Oct. 19, 2015", 14 pgs.

"U.S. Appl. No. 14/095,654, Response filed Apr. 6, 2015 to Non Final Office Action dated Nov. 6, 2014", 12 pgs.

"U.S. Appl. No. 14/095,654, Response filed May 9, 2016 to Non Final Office Action dated Feb. 11, 2016", 11 pgs.

"U.S. Appl. No. 14/095,654, Response filed Aug. 27, 2015 to Restriction Requirement dated May 29, 2015", 6 pgs.

"U.S. Appl. No. 14/095,654, Response filed Sep. 7, 2016 to Final Office Action filed Jul. 8, 2016", 8 pgs.

"U.S. Appl. No. 14/095,654, Restriction Requirement dated May 29, 2015", 6 pgs.

(56) References Cited

OTHER PUBLICATIONS

"U.S. Appl. No. 14/599,746, Non Final Office Action dated Apr. 19, 2017", 10 pgs.
"U.S. Appl. No. 14/599,746, Notice of Allowance dated Sep. 13, 2017", 7 pgs.
"U.S. Appl. No. 14/599,746, Preliminary Amendment filed Jan. 20, 2015", 6 pgs.
"U.S. Appl. No. 14/599,746, Response filed Jul. 19, 2017 to Non Final Office Action dated Apr. 19, 2017", 12 pgs.
"U.S. Appl. No. 15/544,829, 312 Amendment filed Jul. 17, 2020", 7 pgs.
"U.S. Appl. No. 15/544,829, Notice of Allowance dated Apr. 20, 2020", 9 pgs.
"U.S. Appl. No. 15/544,829, Preliminary Amendment, Jul. 19, 2017", 3 pgs.
"U.S. Appl. No. 15/544,829, PTO Response to Rule 312 Communication dated Jul. 31, 2020", 2 pgs.
"U.S. Appl. No. 15/561,410, Corrected Notice of Allowability dated Sep. 3, 2019", 2 pgs.
"U.S. Appl. No. 15/561,410, Corrected Notice of Allowability dated Sep. 12, 2019", 2 pgs.
"U.S. Appl. No. 15/561,410, Non Final Office Action dated 03-22-19", 10 pgs.
"U.S. Appl. No. 15/561,410, Notice of Allowance dated Jul. 17, 2019", 5 pgs.
"U.S. Appl. No. 15/561,410, Preliminary Amendment filed Sep. 25, 2017", 10 pgs.
"U.S. Appl. No. 15/561,410, Response filed Jun. 21, 2019 to Non-Final Office Action dated Mar. 22, 2019", 10 pgs.
"U.S. Appl. No. 15/654,418, Final Office Action dated Mar. 2, 2020", 7 pgs.
"U.S. Appl. No. 15/654,418, Non Final Office Action dated Oct. 15, 2019", 7 pgs.
"U.S. Appl. No. 15/654,418, Notice of Allowance dated May 11, 2020", 7 pgs.
"U.S. Appl. No. 15/654,418, Response filed Jan. 15, 2020 to Non Final Office Action dated Oct. 15, 2019", 14 pgs.
"U.S. Appl. No. 15/654,418, Response filed Apr. 24, 2020 to Final Office Action dated Mar. 2, 2020", 10 pgs.
"U.S. Appl. No. 15/654,418, Response filed Jul. 26, 2019 to Restriction Requirement dated May 30, 2019", 8 pgs.
"U.S. Appl. No. 15/654,418, Restriction Requirement dated May 30, 2019", 5 pgs.
"U.S. Appl. No. 15/767,902, Non Final Office Action dated Jan. 28, 2019", 6 pgs.
"U.S. Appl. No. 15/767,902, Notice of Allowability dated Aug. 12, 2019", 2 pgs.
"U.S. Appl. No. 15/767,902, Notice of Allowance dated May 24, 2019", 5 pgs.
"U.S. Appl. No. 15/767,902, Preliminary Amendment filed Apr. 12, 2018", 10 pgs.
"U.S. Appl. No. 15/767,902, Response filed Apr. 19, 2019 to Non Final Office Action dated Jan. 28, 2019", 11 pgs.
"U.S. Appl. No. 15/835,058, Non Final Office Action dated Aug. 6, 2019", 11 pgs.
"U.S. Appl. No. 15/835,058, Notice of Allowance dated Jan. 31, 2020", 7 pgs.
"U.S. Appl. No. 15/835,058, Preliminary Amendment filed Jan. 5, 2018", 8 pgs.
"U.S. Appl. No. 15/835,058, Response filed Nov. 6, 2019 to Non-Final Office Action dated Aug. 6, 2019", 17 pgs.
"U.S. Appl. No. 16/063,822, Examiner Interview Summary dated Sep. 24, 2020", 5 pgs.
"U.S. Appl. No. 16/063,822, Non Final Office Action dated Jun. 24, 2020", 13 pgs.
"U.S. Appl. No. 16/063,822, Preliminary Amendment filed Jun. 19, 2018", 8 pgs.
"U.S. Appl. No. 16/063,822, Response filed Sep. 23, 2020 to Non Final Office Action dated Jun. 24, 2020", 19 pgs.
"U.S. Appl. No. 16/491,112, Preliminary Amendment filed Sep. 11, 2019", 8 pgs.
"U.S. Appl. No. 16/990,789, Preliminary Amendment filed Sep. 16, 2020", 7 pgs.
"Application Serial No. PCT/AU2015/000639, Invitation to Pay Additional Fees and Partial Search Report dated Nov. 6, 2015", 2 pgs.
"Australian Application Serial No. 2010320606, First Examination Report dated Jul. 5, 2016", 3 pgs.
"Australian Application Serial No. 2010320606, Response filed Jan. 4, 2017 to First Examination Report dated Jul. 5, 2016", 14 pgs.
"Australian Application Serial No. 2017202300, First Examination Report dated Jun. 14, 2018", 4 pgs.
"Australian Application Serial No. 2017202300, Response filed Sep. 7, 2018 to First Examination Report dated Jun. 14, 2018", 6 pgs.
"Australian Application Serial No. 2019200036, First Examination Report dated Mar. 25, 2020", 2 pgs.
"Australian Application Serial No. 2019200036, Response filed May 15, 2020 to Subsequent Examiners Report dated Apr. 8, 2020", 8 pgs.
"Australian Application Serial No. 2019200036, Subsequent Examiners Report dated Apr. 8, 2020", 3 pgs.
"Chinese Application Serial No. 200680025085.2, Office Action dated Oct. 17, 2008", (w/ English Translation), 10 pgs.
"Chinese Application Serial No. 201080052336.2 Response filed Nov. 6, 2014 to Final Office Action dated Ap. 21, 2014", (w/ English Translation of Claims), 14 pgs.
"Chinese Application Serial No. 201080052336.2, Office Action dated Feb. 9, 2015", (w/ English Translation), 9 pgs.
"Chinese Application Serial No. 201080052336.2, Office Action dated Apr. 21, 2014", (W/ English Translation), 12 pgs.
"Chinese Application Serial No. 201080052336.2, Office Action dated Oct. 13, 2015", with English translation of claims, 7 pgs.
"Chinese Application Serial No. 201080052336.2, Response filed Feb. 29, 2016 to Office Action dated Oct. 13, 2015", with English translation of claims, 8 pgs.
"Chinese Application Serial No. 201080052336.2, Response filed Jun. 24, 2015 to Office Action dated Feb. 9, 2015", (w/ English Translation of Claims), 12 pgs.
"Chinese Application Serial No. 201610605209.X, Office Action dated Jan. 11, 2018", W/ English Translation, 12 pgs.
"Chinese Application Serial No. 201610605209.X, Office Action dated Sep. 30, 2018", w/ English translation, 12 pgs.
"Chinese Application Serial No. 201610605209.X, Response Filed Jan. 11, 2019 to Examiner Interview Jan. 8, 2019", with machine translation, 30 pgs.
"Chinese Application Serial No. 201610605209.X, Response filed May 25, 2018 to Office Action dated Jan. 11, 2018", with machine translation, 18 pgs.
"Chinese Application Serial No. 201610605209.X, Response Filed Nov. 19, 2018 to Office Action dated Sep. 30, 2018", with English translation of claims, 9 pgs.
"Chinese Application Serial No. 201680012390.1, Office Action dated Feb. 3, 2020", w/ Translation, 24 pgs.
"Chinese Application Serial No. 201680012390.1, Office Action dated Jun. 17, 2019", w/ English translation, 25 pgs.
"Chinese Application Serial No. 201680012390.1, Response filed 03-26-20 to Office Action mailed 02-03-20", w/ English Claims, 20 pgs.
"Chinese Application Serial No. 201680012390.1, Response filed Oct. 18, 2019 to Office Action dated Jun. 17, 2019", w/ English Claims, 29 pgs.
"Chinese Application Serial No. 20168003037.1, Voluntary Amendment filed", w/ English Claims, 10 pgs.
"Chinese Application Serial No. 201680030371.1, Office Action dated May 30, 2019", w/ English Translation, 9 pgs.
"Chinese Application Serial No. 201680030371.1, Response filed Sep.30, 2019 to Office Action dated May 30, 2019", w/ English Claims, 16 pgs.
"Chinese Application Serial No. 201680061659.5, Office Action dated Apr. 25, 2019", w/ English translation, 18 pgs.

(56) References Cited

OTHER PUBLICATIONS

"Chinese Application Serial No. 201680061659.5, Office Action dated Nov. 25, 2019", with machine translation, 6 pgs.

"Chinese Application Serial No. 201680061659.5, Response filed Jan. 16, 2020 to Office Action daed Nov. 25, 2019", w/ English Claims, 17 pgs.

"Chinese Application Serial No. 201680061659.5, Response filed Aug. 27, 2019 to Office Action dated Apr. 25, 2019", w/ English Claims, 22 pgs.

"Chinese Application Serial No. 201680061659.5, Voluntary Amendment Filed Feb. 1, 2019", w/English Claims, 22 pgs.

"Eurasian Application Serial No. 201791637, Office Action dated Feb. 27, 2019", W/English Translation, 6 pgs.

"Eurasian Application Serial No. 201791637, Office Action dated Oct. 8, 2019", w/ English Translation, 4 pgs.

"Eurasian Application Serial No. 201791637, Response filed Jan. 16, 2020 to Office Action dated Oct. 8, 2019", w/ English Claims, 16 pgs.

"Eurasian Application Serial No. 201791637, Response filed Jun. 27, 2019 to Office Action dated Feb. 27, 2019", w/ English Claims, 15 pgs.

"Eurasian Application Serial No. 201891020, Office Action dated Oct. 21, 2019", w/ English Translation, 4 pgs.

"Eurasian Application Serial No. 201891020, Response filed Jan. 9, 2020 to Office Action dated Oct. 21, 2019", w/ English Claims, 17 pgs.

"Eurasian Application Serial No. 201891483, Office Action dated Sep. 27, 2019", with English translation of claims, 6 pgs.

"European Application Serial No. 04761081, Supplementary Partial European Search Report dated Mar. 31, 2011", 2 pgs.

"European Application Serial No. 04761081.1, Communication Pursuant to Article 94(3) EPC dated Feb. 24, 2017", 6 pgs.

s. "European Application Serial No. 04761081.1, Communication Pursuant to Article 94(3) EPC dated May 31, 2016", 6 pgs.

"European Application Serial No. 04761081.1, Office Action dated Apr. 11, 2012", 7 pgs.

"European Application Serial No. 04761081.1, Response filed Feb. 4, 2013 to Office Action dated Apr. 11, 2012", 12 pgs.

"European Application Serial No. 04761081.1, Response filed May 8, 2017 to Communication Pursuant to Article 94(3) EPC dated Feb. 24, 2017", 11 pgs.

"European Application Serial No. 04761081.1, Response filed Dec. 12, 2016 to Communication Pursuant to Article 94(3) EPC dated May 31, 2016", 23 pgs.

"European Application Serial No. 04761081.1, Supplementary European Search Report dated Apr. 14, 2011", 3 pgs.

"European Application Serial No. 10831224.0, Extended European Search Report dated Feb. 6, 2018", 6 pgs.

"European Application Serial No. 10831224.0, Further Response filed Sep. 7, 2018 to Extended European Search Report dated Feb. 6, 2018", 26 pgs.

"European Application Serial No. 10831224.0, Further Response filed Oct. 5, 2018 to Extended European Search Report dated Feb. 6, 2018", 24 pgs.

"European Application Serial No. 10831224.0, Response filed Sep. 5, 2018 to Extended European Search Report dated Feb. 6, 2018", 49 pgs.

"European Application Serial No. 16739836.1, Extended European Search Report dated Sep. 6, 2018", 5 pgs.

"European Application Serial No. 16739836.1, Response Filed Jan. 11, 2019 to Extended European Search Report dated Sep. 6, 2018", 23 pgs.

"European Application Serial No. 16739836.1, Response filed Feb. 23, 2018", 8 pgs.

"European Application Serial No. 16767517.2, Communication Pursuant to Article 94(3) EPC dated Nov. 14, 2019", 4 pgs.

"European Application Serial No. 16767517.2, Extended European Search Report dated Oct. 8, 2018", 6 pgs.

"European Application Serial No. 16767517.2, Response filed Feb. 25, 2020 to Communication Pursuant to Article 94(3) EPC dated Nov. 14, 2019", 47 pgs.

"European Application Serial No. 16767517.2, Response Filed Sep. 29, 2019 to Extended European Search Report dated Oct. 8, 2018", 56 pgs.

"European Application Serial No. 16767517.2, Response filed May 7, 2018 to Communication pursuant to Rules 161(2) and 162 EPC, dated Nov. 7, 2017", 13 pgs.

"European Application Serial No. 16876998.2, Extended European Search Report dated Jun. 12, 2019", 8 pgs.

"European Application Serial No. 16876998.2, Response filed Jan. 8, 2020 to Extended European Search Report dated Jun. 12, 2019", 19 pgs.

"European Application Serial No. 16876998.2, Response filed Aug. 3, 2018", 13 pgs.

"European Application Serial No. 18763798.8, Extended European Search Report dated Dec. 5, 2019", 8 pgs.

"European Application Serial No. 20175416.5, Extended European Search Report dated Sep. 9, 2020", 6 pgs.

"European Application Serial No. 16856481.3, Extended European Search Report dated Oct. 10, 2018", 5 pgs.

"European Application Serial No. 16856481.3, Response filed Feb. 28, 2019 to Extended European Search Report dated Oct. 10, 2018", 20 pgs.

"German Application Serial No. 112006001186.3, Office Action dated Nov. 20, 2015", W/ English Translation, 11 pgs.

"German Application Serial No. 112006001186,3, Response filed 04-15-16 to Office Action dated Nov. 20, 2015", with English translation of claims, 42 pgs.

"German Application Serial No. 112007001338.9, Office Action dated Jan. 20, 2017", with English translation of claims, 12 pgs.

"German Application Serial No. 112007001338.9, Respose filed Jul. 24, 2017 to Office Action dated Jan. 20, 2017", with machine translation, 7 pgs.

"Indian Application Serial No. 4640/KOLNP/2007, First Examiner Report dated Jul. 15, 2016", 8 pgs.

"Indian Application Serial No. 4640/KOLNP/2007, Office Action dated Aug. 7, 2017", 2 pgs.

"Indian Application Serial No. 46401KOLNP/2007, Response filed Sep. 22, 2017 to Office Action Aug. 7, 2017", W/ English Translation, 16 pgs.

"Indian Application Serial No. 4640/KOLNP/2007, Response filed Jan. 10, 2017 to First Examiner Report dated Jul. 15, 2016", with English translation of claims, 11 pgs.

"Indian Application Serial No. 4859/KOLNP/2008, First Examiner Report dated Sep. 25, 2017", w/ English Translation, 6 pgs.

"Indian Application Serial No. 4859/KOLNP/2008, Response filed Mar. 23, 2018 to First Examiner Report dated Sep. 25, 2017", w/ English Translation, 8 pgs.

"Indian Application Serial No. 5265/DELNP/2012, Amendment filed Jul. 4, 2012", 8 pgs.

"Indian Application Serial No. 5265/DELNP/2012, First Examination Report dated Sep. 2018", W/ English Translation, 7 pgs.

"Indian Application Serial No. 5265/DELNP/2012, Response filed Mar. 22, 2019 to Examination Report dated Sep. 20, 2018", with English translation of claims, 22 pgs.

"International Application No. PCT/IB2010/003161, International Preliminary Report on Patentability dated May 31, 2012", (May 31, 2012), 8 pgs.

"International Application Serial No. PCT/AU2006/000623, International Preliminary Report for Patentability dated Nov. 13, 2007", 6 pgs.

"International Application Serial No. PCT/AU2006/000623, International Search Report dated Sep. 4, 2006", 4 pgs.

"International Application Ser. No. PCT/AU2006/000623, Written Opinion dated Sep. 4, 2006", 5 pgs.

"International Application Serial No. PCT/AU2007/000772, International Search Report dated Jul. 23, 2007", 3 pgs.

"International Application Serial No. PCT/AU2007/000772, Written Opinion dated Jul. 23, 2007", 6 pgs.

(56) References Cited

OTHER PUBLICATIONS

"International Application Serial No. PCT/AU2004/000951, InternationalPreliminary Report on Patentability dated Nov. 4, 2005", 9 pgs.
"International Application Serial No. PCT/AU2004/000951, International Search Report dated Sep. 13, 2004", 3 pgs.
"International Application Srial No. PCT/AU2004/000951, Written Opinion dated Sep. 13, 2004", 4 pgs.
"International Application Serial No. PCT/AU2007/000772, International Preliminary Report on Patentability dated Apr. 21, 2008", 6 pgs.
"International Application Serial No. PCT/AU2015/000639, International Search Report dated Dec. 17, 2015", 6 pgs.
"International Application Serial No. PCT/AU2015/000639, Written Opinion dated Dec. 17, 2015", 6 pgs.
"International Application Serial No. PCT/AU2016/000108, International Preliminary Report on Patentability dated Oct. 5, 2017", 8 pgs.
"International Application Serial No. PCT/AU2016/000108, International Search Report dated Jun. 7, 2016", 7 pgs.
"International Application Serial No. PCT/AU2016/000108, Written Opinion dated Jun. 7, 2016", 6 pgs.
"International Application Serial No. PCT/AU20161050967, International Preliminary Report on Patentability dated May 3, 2018", 6 pgs.
"International Application Serial No. PCT/AU2016/050967, International Search Report dated Dec. 21, 2016", 9 pgs.
"International Application Serial No. PCT/AU2016/050967, Written Opinion dated Dec. 21, 2016", 4 pgs.
"International Application Serial No. PCT/AU2016/051256, International Preliminary Report on Patentability dated Jul. 5, 2018", 8 pgs.
"International Application Serial No. PCT/AU2016/051256, InternationalSearch Report dated Apr. 24, 2017", 6 pgs.
"International Application Serial No. PCT/AU2016/051256, Written Opinion dated Apr. 24, 2017", 6 pgs.
"International Application Serial No. PCT/AU2017/050744, International Preliminary Report on Patentability dated Jan. 31, 2019", 9 pgs.
"International Application Serial No. PCT/AU2017/050744, International Search Report dated Sep. 29, 2017", 4 pgs.
"International Application Serial No. PCT/AU2017/050744, Written Opinion dated Sep. 29, 2017", pgs.
"International Application Serial No. PCT/AU2018/050180, International Preliminary Report on Patentability dated Sep. 19, 2019", 8 pgs.
"International Application Serial No. PCT/AU2018/050180, International Search Report dated May 15, 2018", 5 pgs.
"International Application Serial No. PCT/AU2018/050180, Written Opinion dated May 15, 2018", 6 pgs.
"International Application Serial No. PCT/IB2010/003161, International Search Report and Written Opinion dated May 11, 2011", (May 11, 2011), 11 pgs.
"International Application Serial No. PCT/IB2010/003161, Written Opinion dated May 11, 2011", (May 11, 2011), 13 pgs.
"International Application Serial No. PCT/IB2016/000090, International Preliminary Report Patentability dated Aug. 3, 2017", 6 pgs.
"International Application Serial No. PCT/IB2016/000090, International Search Report dated May 2, 2016", 4 pgs.
"International Application Serial No. PCT/IB2016/000090, Written Opinion dated May 2, 2016", 4 pgs.
"Japanese Application Serial No. 2009-512374, Notice of Allowance dated Jan. 15, 2013", with English translation, 6 pgs.
"Japanese Application Serial No. 2009-512374, Office Action dated May 8, 2012", (w/ English Translation), 4 pgs.
"Japanese Application Serial No. 2009-512374, Response filed Aug. 3, 2012 to Office Action dated May 8, 2012", (w/ English Translation of Claims), 7 pgs.
"Japanese Application Serial No. 2012-539437, Voluntary Amendment filed Dec. 27, 2012", (w/ English Translation of Claims), 10 pgs.

| Condition 1 - full fan speed | Gear pump - Gear motor | Pressure comp piston pump - gear motor | Coupling |
|---|---|---|---|
| Engine speed (rpm) = | 3000 | 3000 | 3000 |
| Pump CID (in^3/rev) = | 3 | 2.9 | na |
| Pump VE = | 95.0% | 98.0% | na |
| Pump ME = | 85.0% | 90.0% | na |
| Pump OE = | 80.8% | 88.2% | 100.0% |
| Pump flow (gpm) = | 24.7 | 24.6 | na |
| Motor CID (in^3/rev) = | 2.55 | 2.55 | na |
| Motor VE = | 90.0% | 90.0% | 96.0% |
| Motor speed = | 2011.8 | 2006.1 | 1920.0 |
| Motor ME = | 85.0% | 85.0% | 100.0% |
| Motor OE = | 76.5% | 76.5% | 96.0% |
| System eff = | 61.8% | 67.5% | 96.0% |
| Desired fan output power (HP) = | 25.0 | 25.0 | 25.0 |
| Motor output torque (lb-in) rqd = | 783.2 | 785.4 | na |
| System pressure (psi) = | 1699.5 | 1644.1 | na |
| "Slip" power lost (HP) = | 0.0 | 0.0 | 0.0 |
| Input power (HP) = | 40.5 | 37.1 | 26.0 |

FIG. 9

| Condition 2 - half fan speed | Fan power goes up with the cube of speed. Use this relationship to establish new system pressure requirements. | | |
|---|---|---|---|
| Engine speed (rpm) = | 2000 | 2000 | 2000 |
| Desired motor speed (rpm) = | 1005.9 | 1003.1 | 960.0 |
| Motor CID (in^3/rev) = | 2.55 | 2.55 | na |
| Motor ME = | 85.0% | 85.0% | 100.0% |
| System pressure (psi) = | 208.6 | 207.4 | 208.6 |
| Motor VE = | 90.0% | 90.0% | 90.0% |
| Motor input flow required (gpm) = | 12.3 | 12.3 | na |
| Pump CID (in^3/rev) = | 3 | 1.87 | na |
| Pump VE = | 95.0% | 95.0% | na |
| Pump ME = | 85.0% | 90.0% | na |
| Actual pump flow (gpm) = | 24.7 | 12.3 | na |
| Bypass flow (gpm) = | 12.3 | 0.0 | 12.3 |
| "Slip" power lost (HP) = | 1.5 | 0.0 | 1.5 |
| Input pump power (HP) = | 2.6 | 1.3 | 0.0 |
| Total input power = | 4.1 | 1.3 | 1.5 |

FIG. 10

| Condition - 3/4 fan speed | Fan power goes up with the cube of speed. Use the relationship to establish new system pressure requirements. | | |
|---|---|---|---|
| Engine speed (rpm) = | 2000 | 2000 | 2000 |
| Desired motor speed (rpm) = | 1500.0 | 1500.0 | 1500.0 |
| Motor CID (in^3/rev) = | 2.55 | 2.55 | na |
| Motor ME = | 85.0% | 85.0% | 100.0% |
| System pressure (psi) = | 691.7 | 691.8 | 691.7 |
| Motor VE = | 90.0% | 90.0% | 90.0% |
| Motor input flow required (gpm) = | 18.4 | 18.4 | na |
| Pump CID (in^3/rev) = | 3 | 2.8 | na |
| Pump VE = | 85.0% | 85.0% | na |
| Pump ME = | 85.0% | 90.0% | na |
| Actual pump flow (gpm) = | 24.7 | 18.4 | na |
| Bypass flow (gpm) = | 6.3 | 0.0 | 6.3 |
| "Slip" power lost (HP) = | 2.5 | 0.0 | 2.5 |
| Input pump power (HP) = | 8.5 | 6.7 | 0.0 |
| Total input power = | 11.0 | 6.7 | 2.5 |

FIG. 11

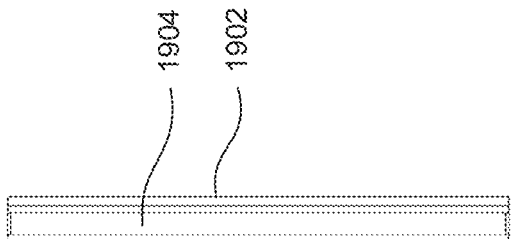
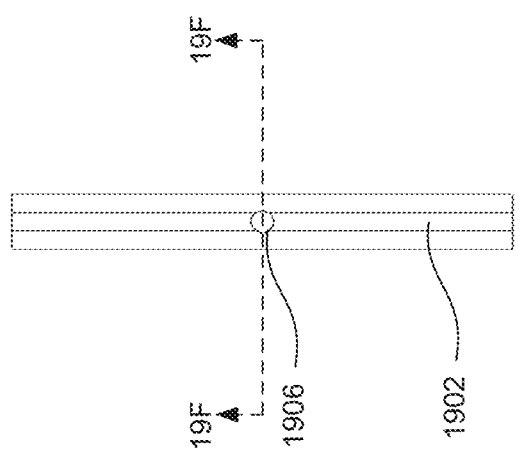
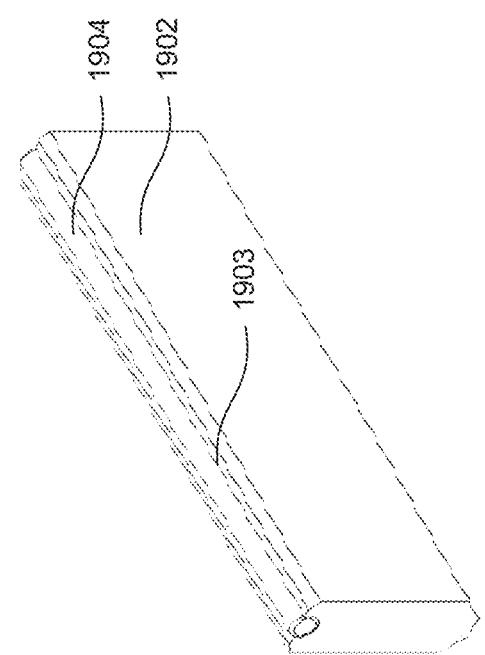
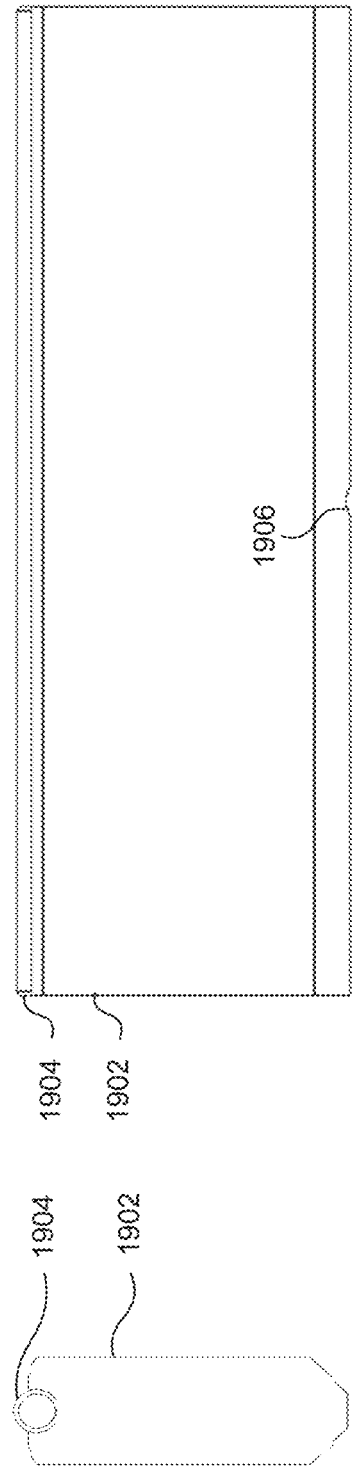

HYDROSTATIC TORQUE CONVERTER AND TORQUE AMPLIFIER

PRIORITY CLAIMS AND RELATED APPLICATIONS

This application is a continuation application of U.S. application Ser. No. 15/835,058, filed Dec. 7, 2017, which application is a continuation application of U.S. application Ser. No. 14/599,746, filed Jan. 19, 2015, which is a continuation application of U.S. application Ser. No. 13/510,643, filed May 18, 2012, which is a U.S. national stage application under 35 U.S.C. § 371 of PCT/IB2010/003161, filed Nov. 19, 2010, and published as WO 2011/061630 A2 on May 26, 2011, which claims priority to U.S. Provisional Application Ser. No. 61/263,304, filed Nov. 20, 2009, and to U.S. Provisional Application Ser. No. 61/263,295, filed Nov. 20, 2009, which applications and publication are incorporated by reference as if reproduced herein and made a part hereof in their entirety, and the benefit of priority of each of which is claimed herein.

The present application is related to international application no. PCT/AU2007/000772, publication no. WO/2007/140514, entitled, "Vane Pump for Pumping Hydraulic Fluid," filed Jun. 1, 2007; international application no. PCT/AU2006/000623, publication no. WO/2006/119574, entitled, "Improved Vane Pump," filed May 12, 2006; and international application no. PCT/AU2004/00951, publication no. WO/2005/005782, entitled, "A Hydraulic Machine," filed Jul. 15, 2004, the entire specification of each of which is incorporated herein by reference in their entirety.

TECHNICAL FIELD

This document relates generally to rotary couplings, and more particularly, to a hydrostatic torque converter.

BRIEF DESCRIPTION OF THE DRAWINGS

The drawings illustrate generally, by way of example, various embodiments discussed in the present document. The drawings are for illustrative purposes only and may not be to scale.

FIG. 9 is a table showing experimental figures related to a first operating condition.

FIG. 10 is a table showing experimental figures related to a first operating condition.

FIG. 11 is a table showing experimental figures related to a first operating condition.

FIG. 19A is a perspective view of a vane including a roller tip, according to an example.

FIG. 19B is a bottom view of FIG. 19A.

FIG. 19C is a top view of FIG. 19A.

FIG. 19D is a front view of FIG. 19A.

FIG. 19E is a side view of FIG. 19A.

DETAILED DESCRIPTION

Figure 1A:
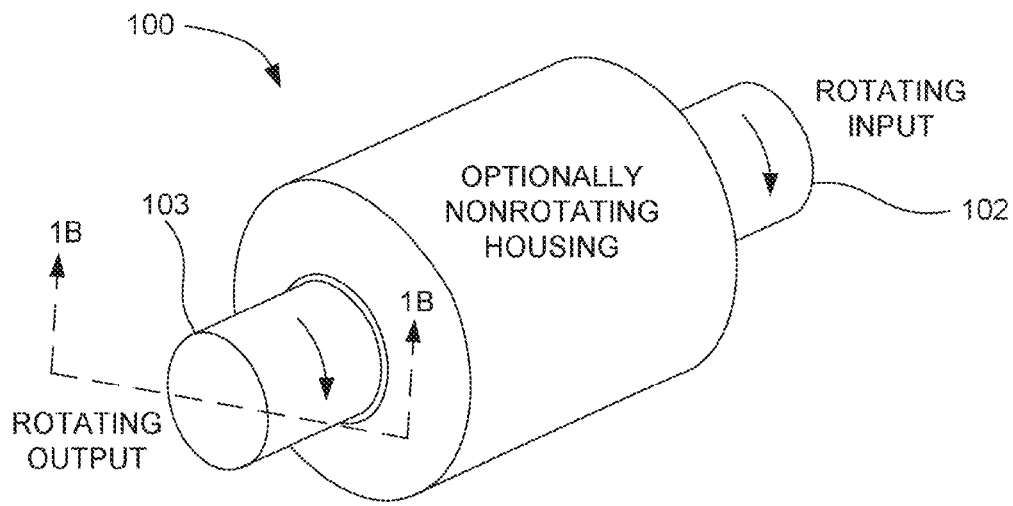
FIG. 1A is a perspective view of a hydrostatic torque converter, according to some examples.

This describes examples in which a couple transmits rotary motion from an input of the couple to an output of the couple. In various examples, a couple is hydraulically controlled, such as with a pilot signal, to control fixing a torque input of the couple and a torque output of the couple such that a rotational torque on the input of the couple is transmitted to the output of the couple. In response to a further pilot signal the couple is controlled to unfix the input of the couple and the output of the couple to allow the input of the couple and the output of the couple to rotate independently.

In various examples, a couple includes a hydraulic pump with a rotating group coupled to an input of the couple, and with a rotating group housing coupled to an output of the couple. In various examples, by rotating the rotating group in the rotating group housing, the pump will pump oil once a threshold torque between the input of the couple and the output of the couple is reached. Until the threshold torque is reached, the pump transmits torque from the input of the couple to the output of the couple without pumping oil, and accordingly is highly efficient. In various examples, through pumping oil, a couple can be overloaded without damage. In some examples, the pumped oil escapes over a relief valve. In some examples, the maximum amount of torque transferred is adjustable by adjusting the relief valve.

The couple is useful in a variety of applications, such as to drive a fan to cool a machine, to transmit torque in a vehicle, to control torque transmission in an industrial machine, or to accomplish other acts in which an output torque is to be selectively deactivated from an input torque. The couple improves upon prior designs such as clutches and torque converters by using a hydraulic device that can efficiently transmit high torques. Some examples use vane pumps that can be economically manufactured.

The couple is efficient because there are few or no efficiency penalties when the couple engages the input of the couple and the output of the couple to spin together. When spinning together, there are few or no hydraulic efficiency losses such as those losses in a torque converter that cannot lock. The couple further improves efficiency by enabling the selective disengagement of rotating machines. For example, a conventional power output of a machine, such as a power take-off, would normally spin whatever was hooked to it in concert with the rotation of the power take-off. The couple improves upon this by enabling for the disengagement of that which is coupled to the power output, saving energy. In some embodiments, the couple uses a closed system requiring only a pilot signal and an optional drain to tank or reservoir. Some examples include an adjustable relief valve to control maximum torque transmitted.

This document presents examples of a multi-mode torque multiplying system. The system is to couple to a torque source such as an engine or electric motor to output torque such as to a transmission or another powertrain component. The pumps are controlled such as with a valve to selectively transmit power or absorb power for future use. The system improves upon prior drive designs by providing a hydraulically controllable coupling between the torque source and a load to be driven with torque. Unlike other hybrid hydraulic approaches, in certain instances the hydraulically controllable couple provides an improved configuration in which the system can reduce or eliminate hydraulic propulsion, and its associated inefficiencies, to improve performance of a vehicle or industrial drive system.

Figure 1B:
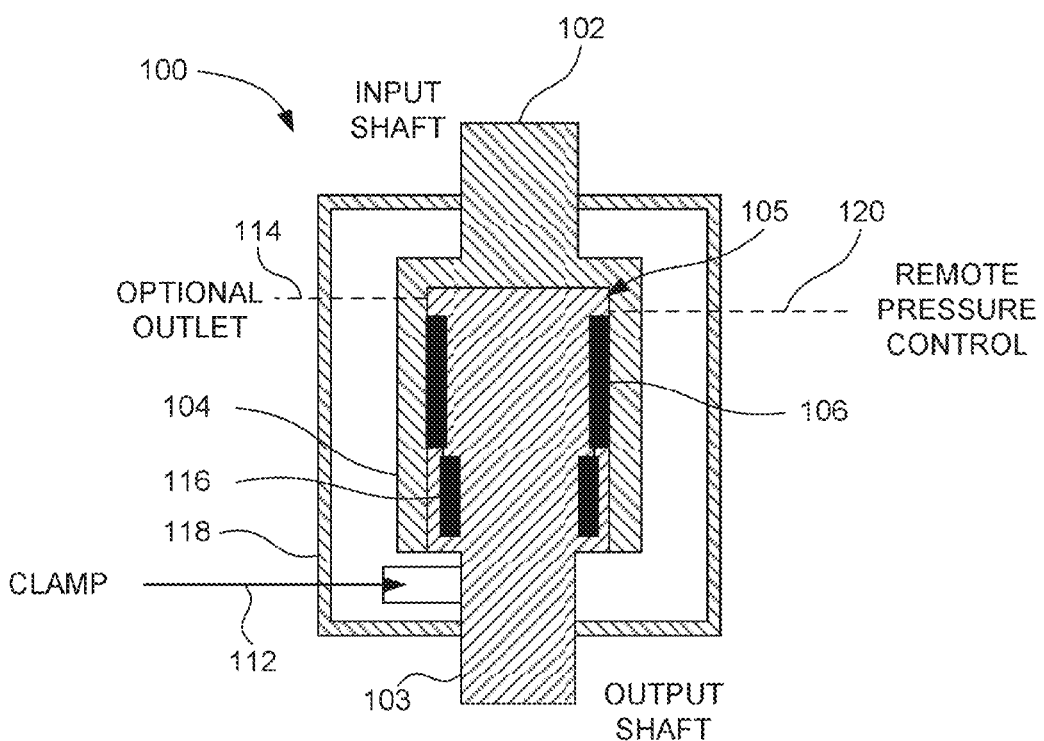
FIG. 1B is a cross section taken along line 1B-1B in FIG. 1A.

FIG. 1A is a perspective view of a hydrostatic torque converter, according to some examples. FIG. 1B is a cross section taken along line 1B-1B in FIG. 1A. Various embodiments include an input shaft 102 coupled to rotate a body 104 defining a chamber 105. The body 104, in some examples, is a vane pump or vane motor housing or a portion thereof, such as a ring. In further examples, the body 104 is housing of another kind of pump, such as a piston pump or motor or a gear pump or motor. Rotating the body 104 can rotate the rotating group 105 and in turn rotate the output 103. Such rotating occurs in some examples when the couple 100 is in mode in which the rotating group 105 works fluid such as hydraulic fluid between the rotating group 105 and the body 104.

In the operational mode in which rotation of the body 104 works fluid between the body 104 and the rotating group 105, pressures between the two are maintained at a high level, resisting rotational movement between the two, thereby imparting high torque to the output 103. To release the rotating group 105 from a couple with the body 104 to allow independent rotation of the input 102 and the output 103, the rotating group 105 and the body 104 are switched to a mode in which the rotating group 105 does not work fluid, thereby allowing the rotating group 105 to rotate and thus the output 103 to rotate.

In various embodiments, the rotating group 105 is in fluid communication with an inlet 112. Some examples position portions of the couple 100 in fluid communication with an optional drain 114. A fluid signal from the inlet 112 is to switch the couple 100 from a first mode, in which the input 102 can rotate with respect to the output 103, and a second mode, in which they are coupled due to the resistance of the rotating group 105 to pump fluid by working fluid against the body 104. In various embodiments, working surfaces 106 of the rotating group 105 are either deployed in the first mode or retracted in the second mode. In a deployed mode, the working surface 106 works fluid to rotate the body 104. In a retracted mode, the working surfaces 106 are retracted and do little or no work to fluid, thereby allowing the body 104 to move with respect to the rotating group 105. Retainers 116 are used to either deploy or retract the working surfaces 106. In some embodiments, the first mode deploys vanes of a vane pump, and in the second mode, retracts them.

Various examples include an optional remote pressure control 120. In some examples, the remote pressure control is coupled to one side of a balance piston, with pump output in fluid communication with the opposite side of the balance piston. The balance piston is to control whether the pump can pump oil. For example, if the remote pressure control is set to a pressure, the balance piston allows coupling discharge pressure to rise until the coupling discharge pressure is higher than the pressure, moving the balance piston to overcome the remote pressure control pressure. As the balance piston moves, it enables the coupling discharge to drain, such as to tank. In such a manner, the maximum torque transmitted is remotely controllable via the remote pressure control signal 120. In some examples, the remote pressure control is used in addition to a primary relief valve that allows oil to pump in any case where a torque differential between a couple input 102 and a couple output 103 exceeds a predetermined threshold.

In some examples, the inlet 112, drain 114 and remote pressure control 120 are coupled to a coupling housing 118, but the present subject matter is not so limited. In some of these examples, various seals are used to guide the inlet 112 signal to the appropriate portion of the couple 100. Additional seals guide any excess fluid out the drain 114. Further seals guide the remote pressure control to a valve such as a balance piston. The drain 114 is optional and some examples control which mode the couple 100 operates in without use of an drain 114. In some examples, the housing 118 is omitted in favor of running the remaining portions of the couple 100 in an oil bath.

In additional embodiments, the inlet 112 is coupled to one of the input 102 or the output 103. In some examples, the drain 114 is coupled to the other of the input 102 or the output 103. Some examples couple the inlet 112 and the drain 114 both to one of the input 102 and the output 103. It should be noted that the assignment of the body 104 as the input is not limiting, and the body could alternatively be coupled to an output.

The present subject matter includes embodiments in which working surfaces of other pumps are held in a retracted position. For example, a retainer retains a piston of a piston pump to prevent the piston from moving in a cylinder bore to work a fluid.

Figure 2:
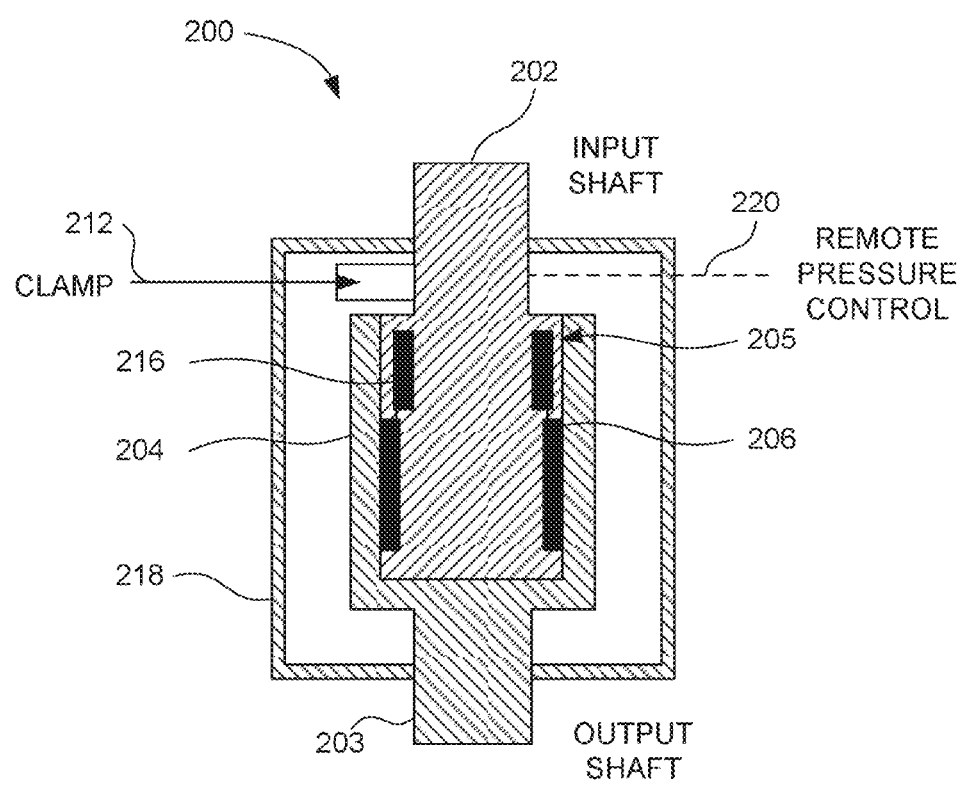
FIG. 2 is a cross section view of a hydrostatic torque converter, according to some examples.

FIG. 2 is a cross section view of a hydrostatic torque converter, according to some examples. In this embodiment, an input shaft 202 is coupled to a rotating group 205 to turn the rotating group when the couple 200 is in mode in which the rotating group 205 works fluid such as hydraulic fluid between the rotating group 205 and the body 204. Various embodiments include an output shaft 202 coupled to rotate a body 204 defining a chamber 205. The body 204, in some examples, is a vane pump or vane motor housing. In further examples, the body 204 is housing of another pump, such as a piston pump or motor or a gear pump or motor.

In an operational mode in which rotation of the rotating group 205 works fluid between the body 204 and the rotating group 205, pressures between the two are maintained at a high level, resisting rotational movement between the two, thereby imparting high torque to the output 203. To release the rotating group 205 from a couple with the body 204 to allow independent rotation of the output 202 and the input 203, the rotating group 205 and the body 204 are switched to a mode in which the rotating group 205 does not work fluid, thereby allowing the rotating group 205 to rotate and thus the input 203 to rotate.

In various embodiments, the rotating group 205 is in fluid communication with an inlet 212. A fluid signal from the inlet 212 is to switch the couple 200 from a first mode, in which the output 202 can rotate with respect to the input 203, and a second mode, in which they are coupled due to the resistance of the rotating group 205 to pump fluid by working fluid against the body 204. In various embodiments, working surfaces 206 of the rotating group 205 are either deployed in the first mode or retracted in the second mode. In a deployed mode, the working surface 206 works fluid to rotate the body 204. In a retracted mode, the working surfaces 206 are retracted and do little or no work to fluid, thereby allowing the body 204 to move with respect to the rotating group 205. Retainers 216 are used to either deploy or retract the working surfaces 206. In some embodiments, the first mode deploys vanes of a vane pump, and in the second mode, retracts them. In some examples, inertial forces draw the working surface 206 out to meet the body 204, such as when the input 202 is spinning rapidly.

Various examples include an optional remote pressure control 220. In some examples, the remote pressure control is coupled to one side of a balance piston, with pump output in fluid communication with the opposite side of the balance piston. The balance piston is to control whether the pump can pump oil. For example, if the remote pressure control is set to a pressure, the balance piston allows coupling discharge pressure to rise until the coupling discharge pressure is higher than the pressure, moving the balance piston to overcome the remote pressure control pressure. As the balance piston moves, it enables the coupling discharge to drain, such as to tank. In such a manner, the maximum torque transmitted is remotely controllable via the remote pressure control signal 220. In some examples, the remote pressure control is used in addition to a primary relief valve that allows oil to pump in any case where a torque differential between a couple input 202 and a couple output 203 exceeds a predetermined threshold.

In some examples, the inlet 208 is coupled to a coupling housing 218, but the present subject matter is not so limited. In these embodiments, various seals are used to guide the inlet 212 signal to the appropriate portion of the couple 200. In some examples, the housing 218 is omitted in favor of running the remaining portions of the couple 200 in an oil bath. In additional embodiments, the inlet 112 is coupled to one of the output shaft 202 or the input shaft 203.

Figure 3B:
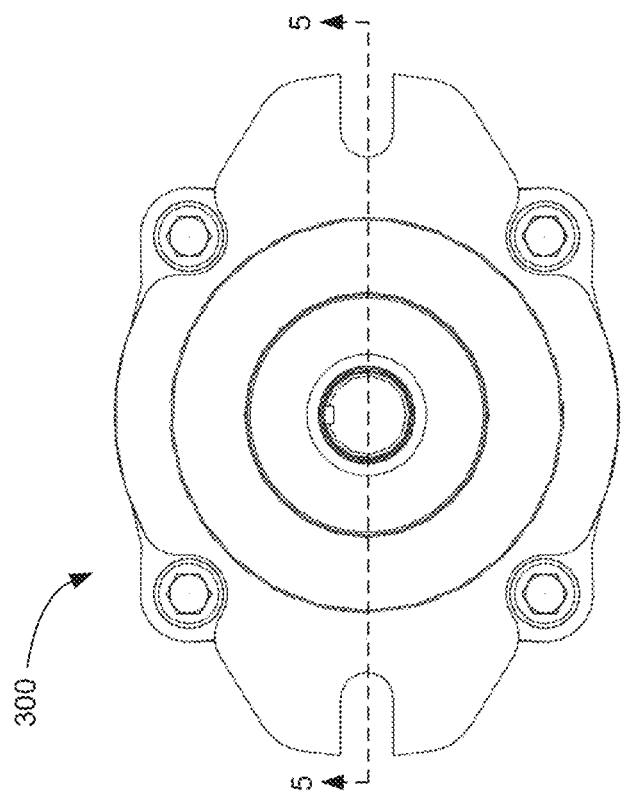
FIG. 3B is a front view of the hydrostatic torque converter of FIG. 3A, according to some embodiments.
Figure 3A:
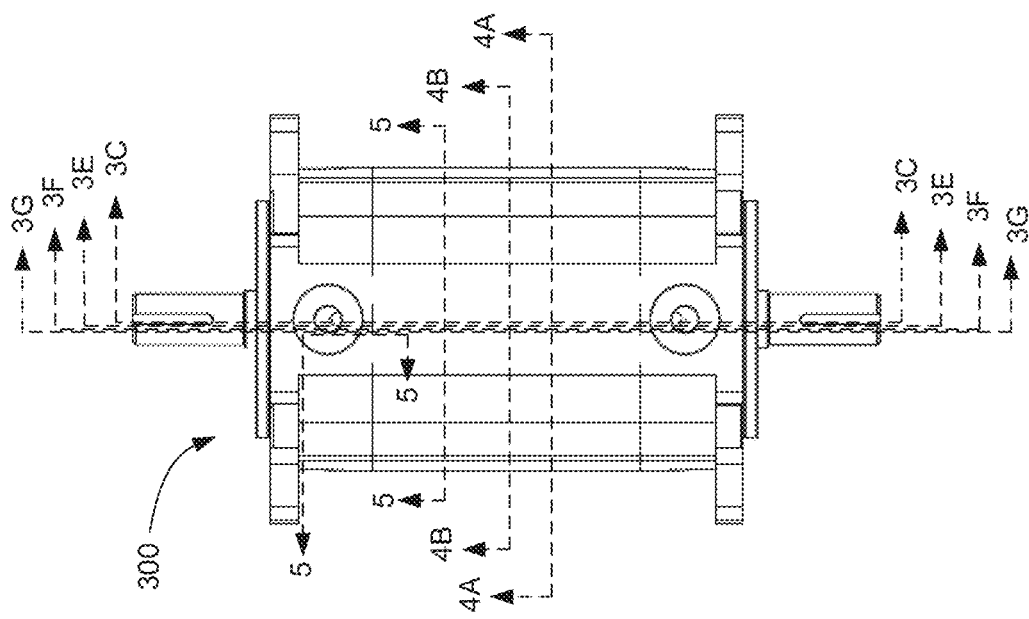
FIG. 3A is a top view of a hydrostatic torque converter, according to some embodiments.
Figure 3C:
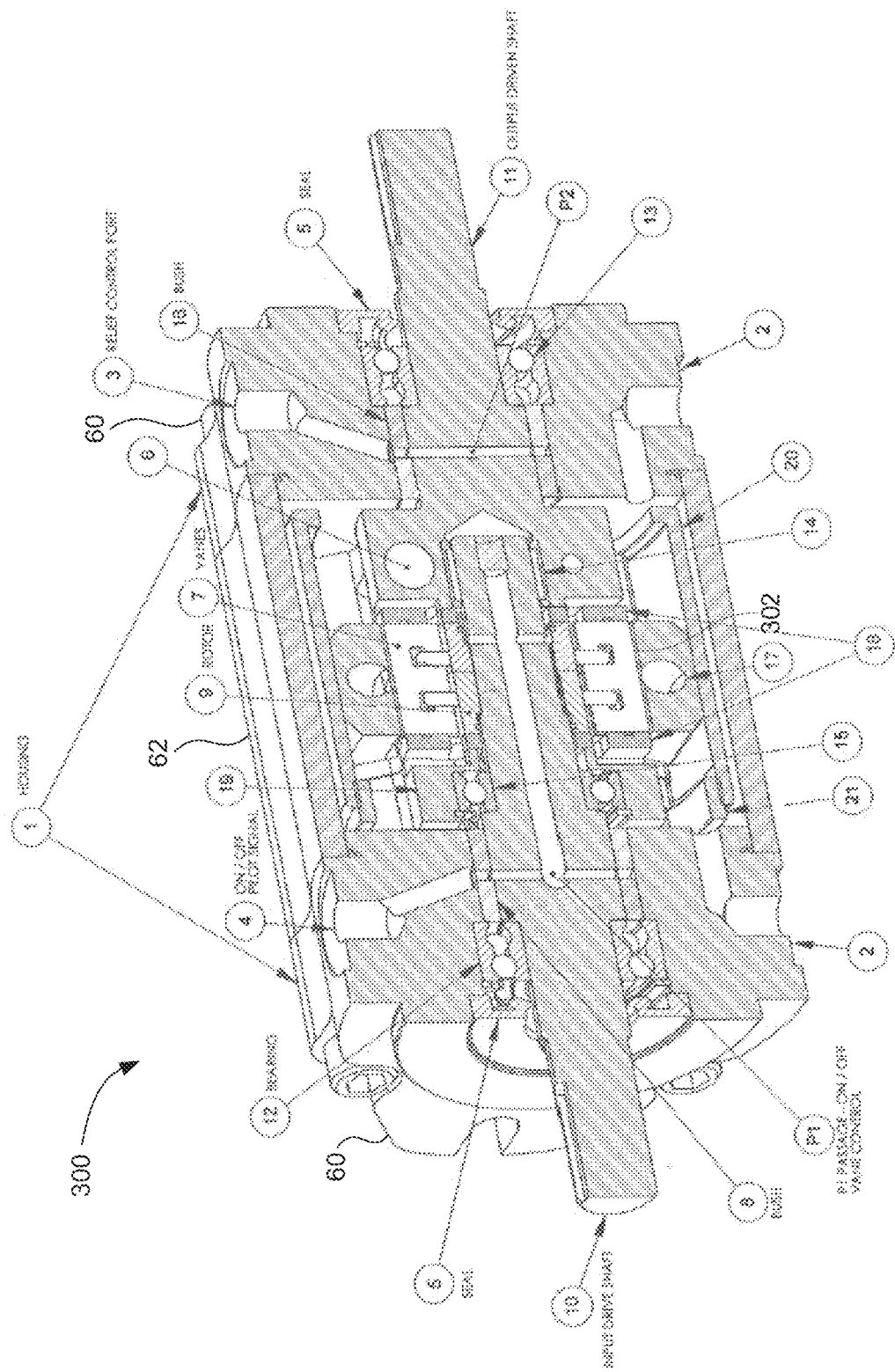
FIG. 3C is a cross section of the hydrostatic torque converter of FIG. 3A taken along the line 3C-3C.
Figure 3D:
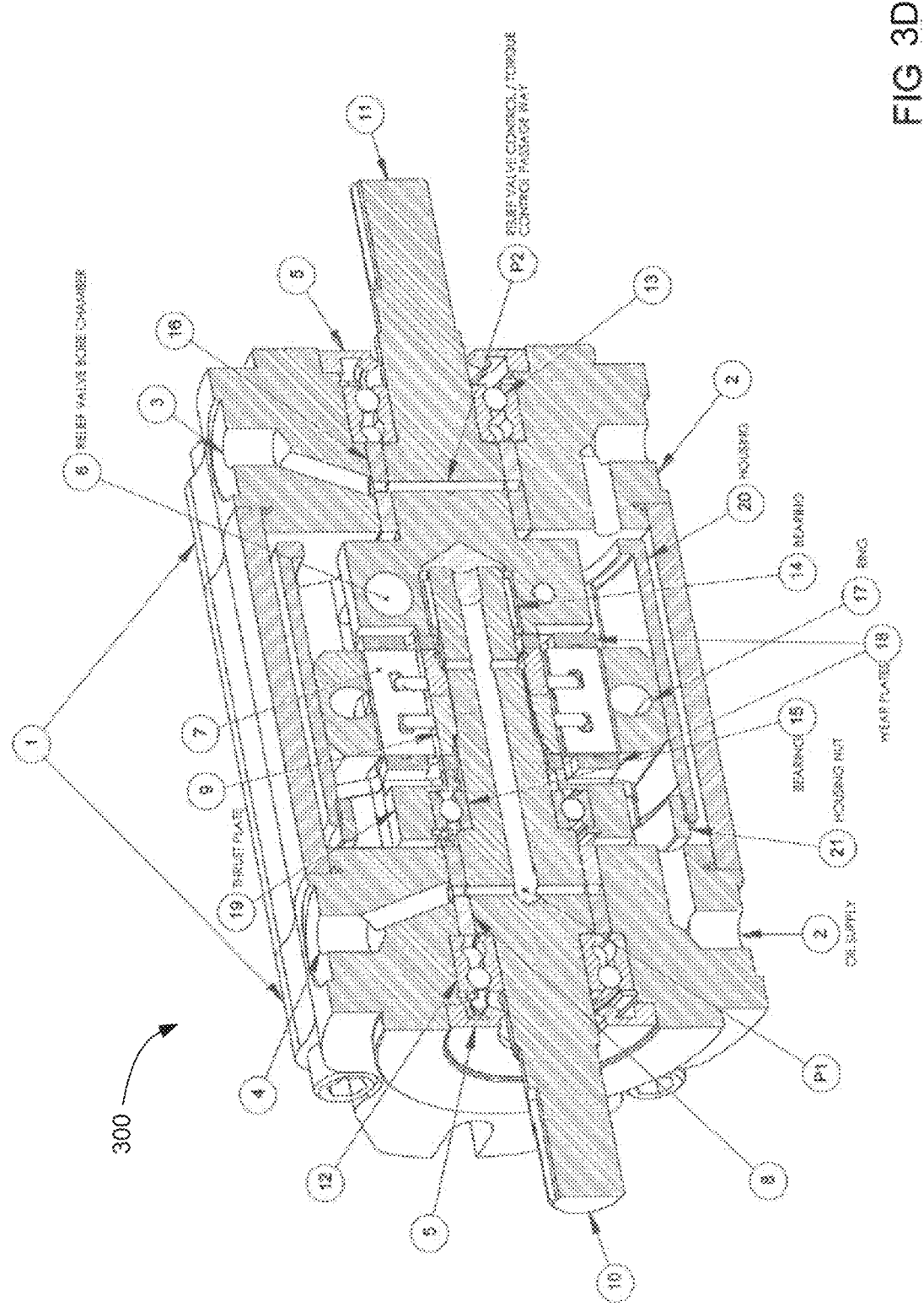
FIG. 3D is a cross section of the hydrostatic torque converter of FIG. 3A taken along the line 3C-3C.
Figure 3E:
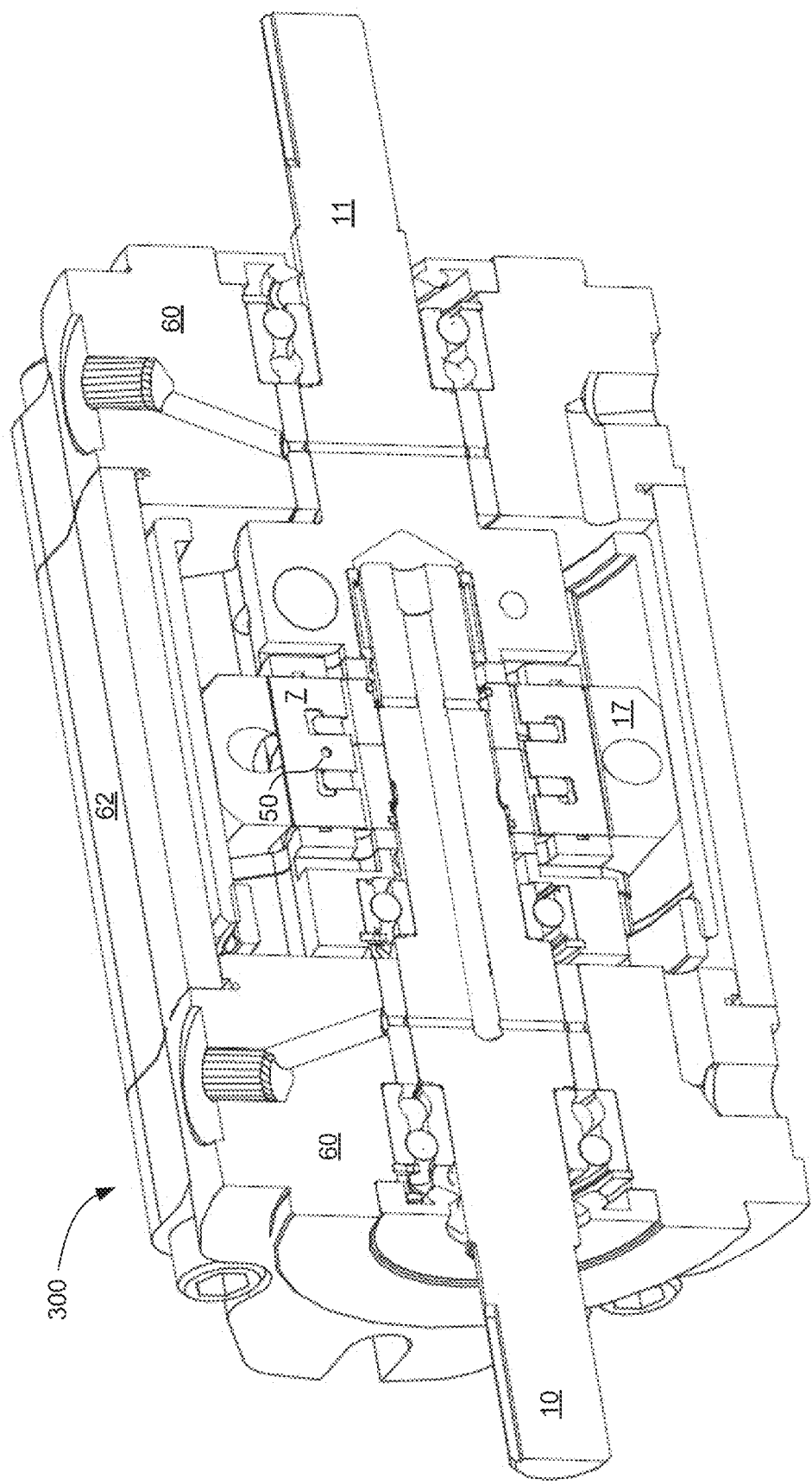
FIG. 3E is a cross section of the hydrostatic torque converter of FIG. 3A taken along the line 3E-3E.
Figure 3F:
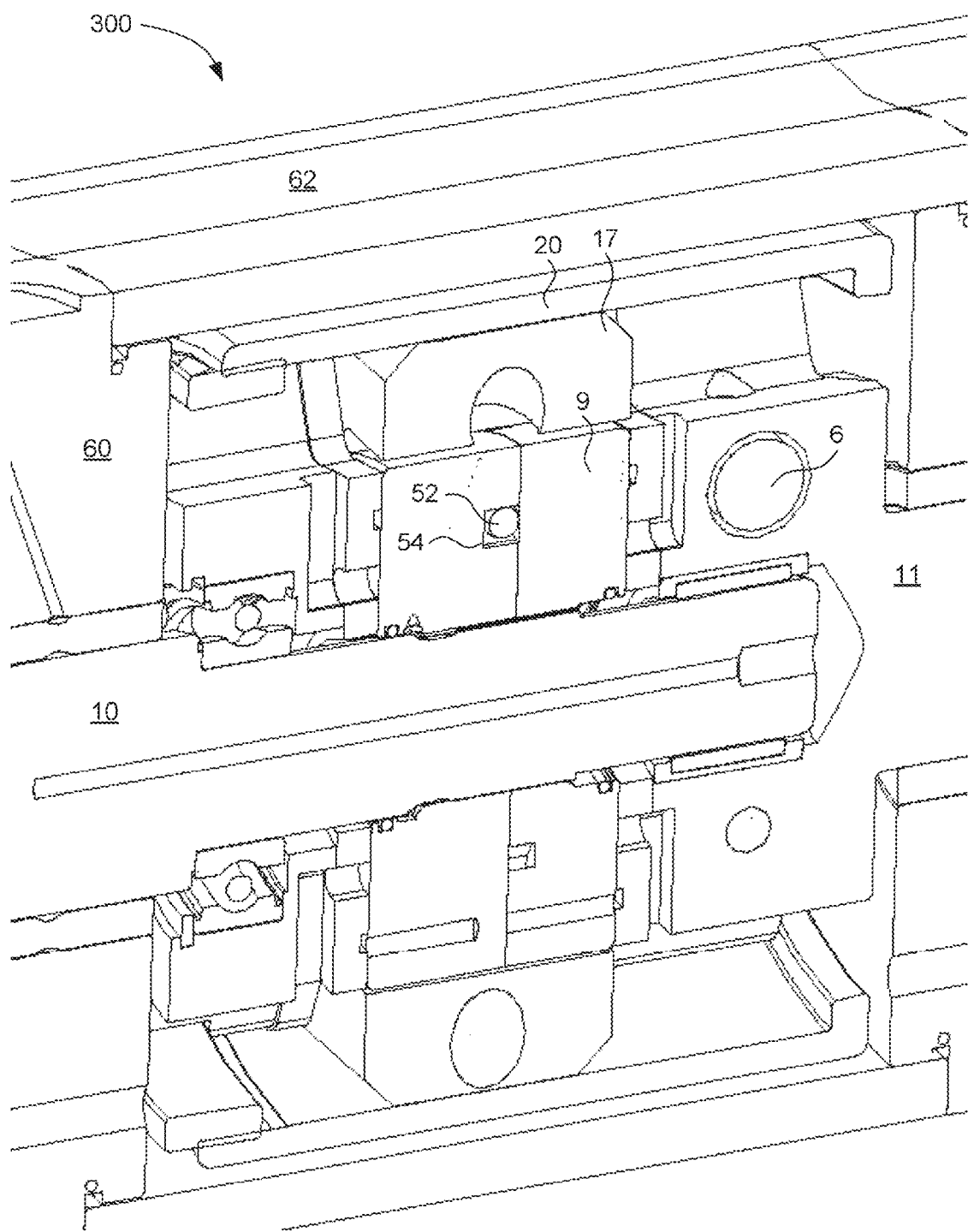
FIG. 3F is a partial cross section of the hydrostatic torque converter of FIG. 3A taken along the line 3F-3F.
Figure 3G:
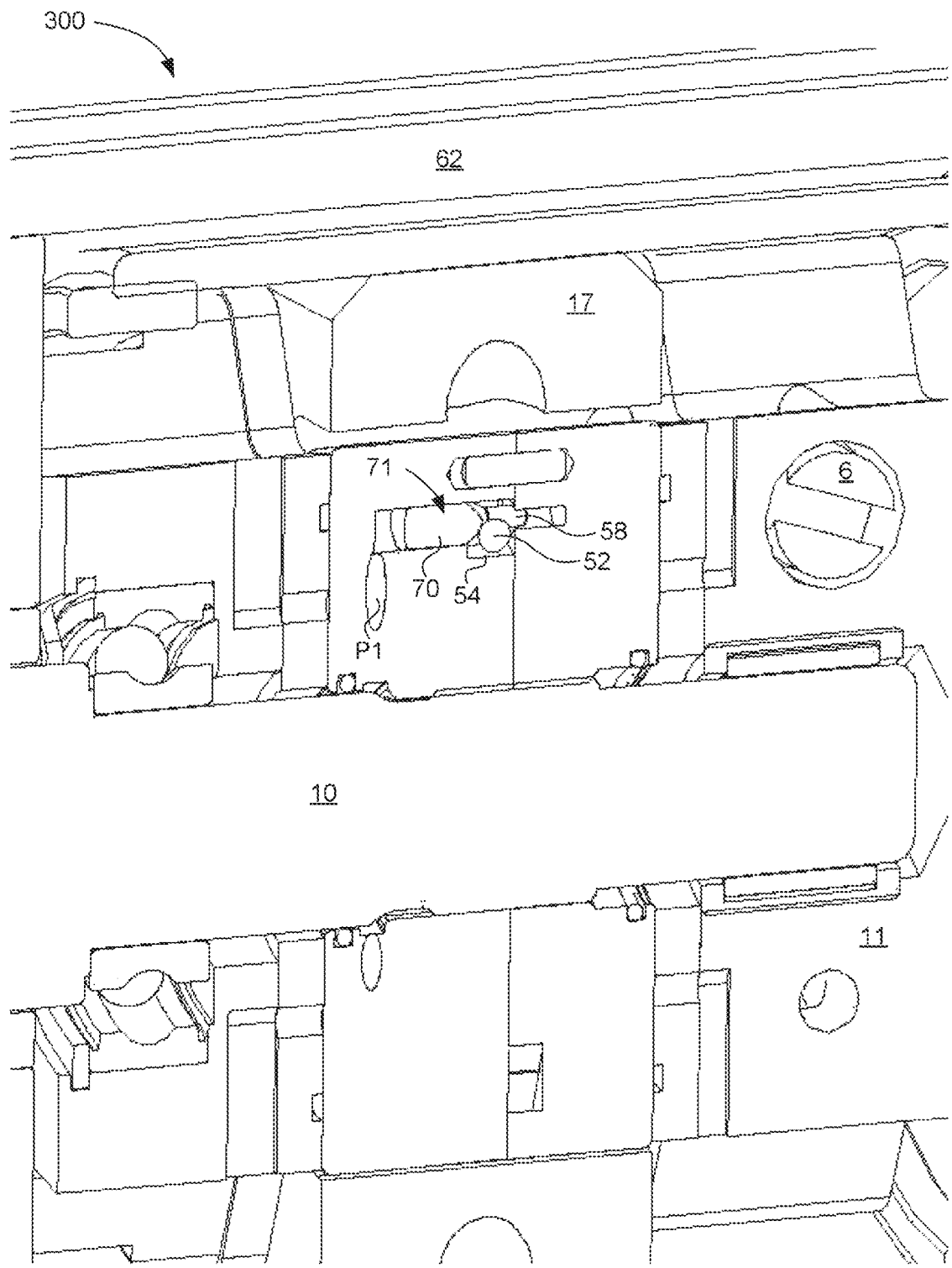
FIG. 3G is a partial cross section of the hydrostatic torque converter of FIG. 3A taken along the line 3G-3G.
Figure 4A:
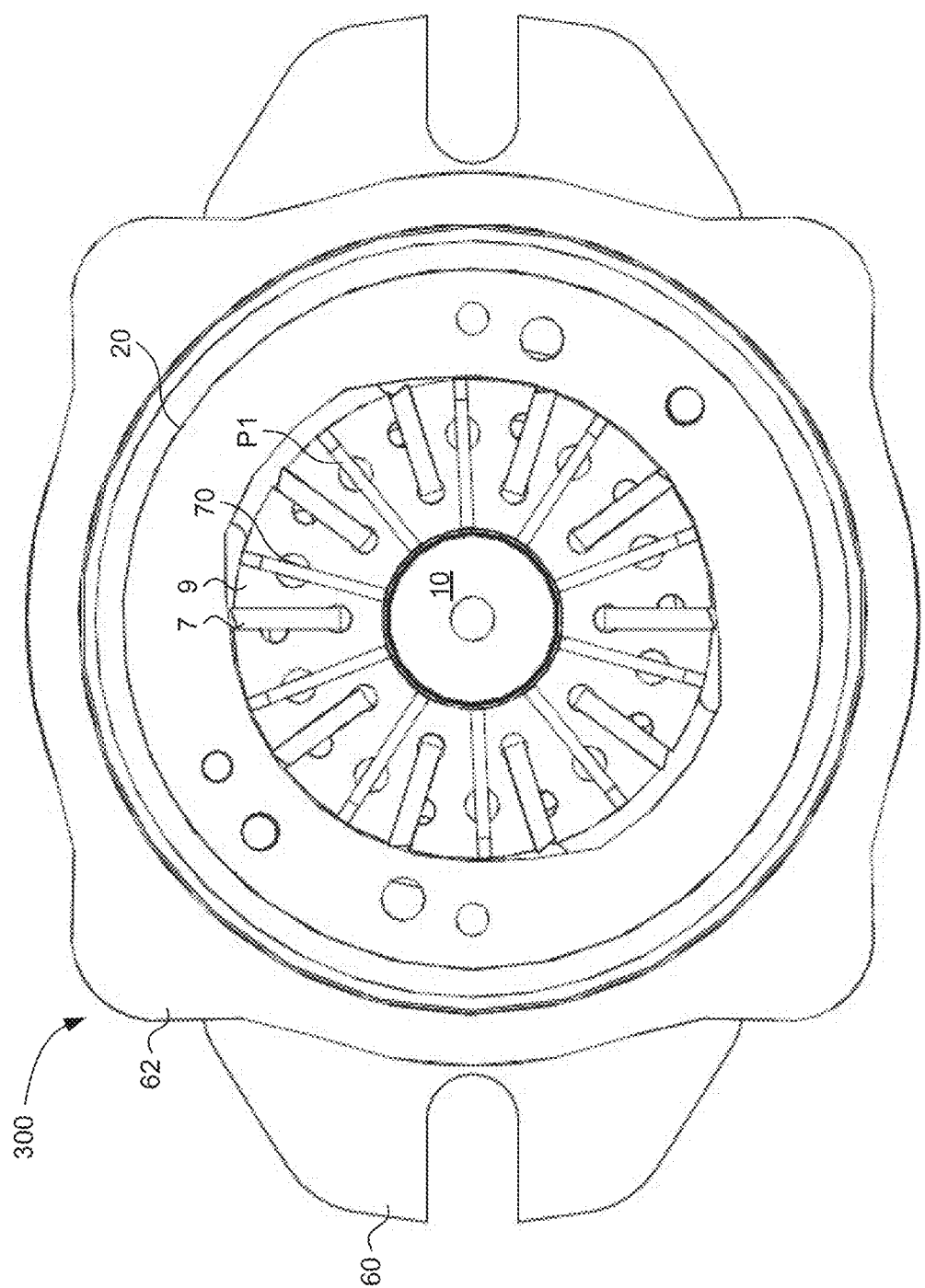
FIG. 4A is a cross section of the hydrostatic torque converter of FIG. 3A taken along the line 4A-4A.
Figure 4B:
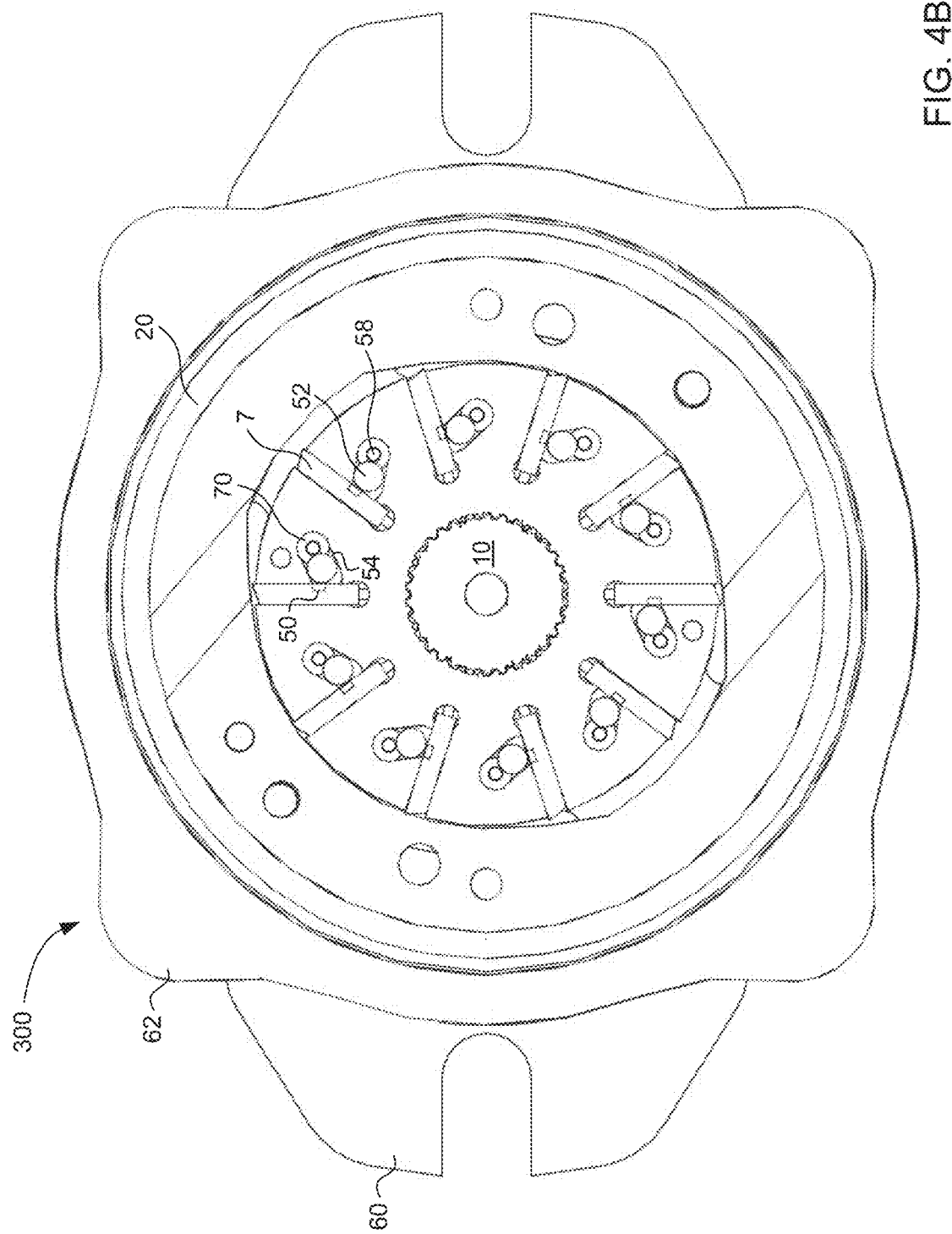
FIG. 4B is a cross section of the hydrostatic torque converter of FIG. 3A taken along the line 4B-4B.

FIG. 3A is a top view of a hydrostatic torque converter, according to some embodiments. FIG. 3B is a front view of the hydrostatic torque converter of FIG. 3A, according to some embodiments. FIG. 3C is a cross section of the hydrostatic torque converter of FIG. 3A taken along the line 3C-3C. FIG. 3D is a cross section of the hydrostatic torque converter of FIG. 3A taken along the line 3C-3C. FIG. 3E is a cross section of the hydrostatic torque converter of FIG. 3A taken along the line 3E-3E. FIG. 3F is a partial cross section of the hydrostatic torque converter of FIG. 3A taken along the line 3F-3F. FIG. 3G is a partial cross section of the hydrostatic torque converter of FIG. 3A taken along the line 3G-3G. This detailed depiction is of one embodiment, and other embodiments are possible, including embodiments in which another style of pump is used, such as a piston pump or a gear pump.

Various embodiments include an input 10 coupled to couple to a torque source. An output 11 is to couple to a powertrain. Examples include a body 17 defining a chamber 302 in fluid communication with an inlet and an discharge pressure of the hydraulic couple 300. Various embodiments include a rotating group that includes a rotor 9 to rotate around an axis inside the chamber 302. In various embodiments, the rotor defines a first slot 304 extending parallel to the axis along an exterior of the rotor and opening to the chamber, and a second slot opposite the first and opening to the chamber, the rotor further defining a retainer passage in fluid communication with the first slot with a first vane 7 disposed in the first slot and a second vane 7 disposed in the second slot. Various embodiments include a hydraulically controlled retainer disposed in the retainer passage to retain the first vane in a retracted vane mode of operation and to release the first vane in a vane extended mode of operation in which the first vane and the second vane extend to meet the body to hydraulically work fluid when the first vane and the second vane are moved with respect to the body. In various examples, a pump motor output shaft 11 is propelled in the vane extended mode of operation.

Various embodiments include a coupling housing 1. Some examples include two end bodies 60 and a sleeve 62. Some sealed examples include rotary seals 5 to retain the fluid. In various examples, the port 2 allows oil into and out of the housing 1. In some examples, fluid is to flow to and from a separate reservoir. Alternatively, some examples use a large housing that accommodates enough fluid for operation and cooling. The couple 300 is not limited to application in which the housing is used 1 to retain fluid.

In some examples, port 4 is to engage and disengage the coupling 300 to drive by restraining and releasing the vanes 7. In some examples, port 4 connects through passage P1 via bushing 8 into the rotor 9. In some examples, this allows the vanes 7 to be either restrained or released, such as by moving retainers 71, including wide portions 70 and narrow portions 58, to move a ball 52 through a passage 54 at least partially into a detent 50 to retain a vane 7. One example of vane retraction or release is set forth in US Patent Application Publication No. 2006/0133946, commonly assigned and incorporated herein by reference. Release of the vanes will result in the operation of the coupling that will try to operate as a hydraulic pump.

In some examples, port 4 is to engage and disengage the coupling 300 to drive by restraining and releasing the vanes 7. In some examples, port 4 connects through passage P1 via bushing 8 into the rotor 9. In some examples, this allows the vanes 7 to be either restrained or released. One example of vane retraction or release is set forth in US Patent Application Publication No. 2006/0133946, commonly assigned and incorporated herein by reference. Release of the vanes will result in the operation of the coupling that will try to operate as a hydraulic pump.

In various embodiments, the drive shaft 10 is connected to the rotor 9. In some examples, the drive shaft 10 rotates inside bearings 12, 15 and bushing 8. The drive shaft is configured for connection to a power source such as an electric motor or diesel engine or other in some embodiments. The output shaft 11 rotates inside bearings 13, 14 and bushing 16. Bearing applications can optionally be substituted with bushings, and vice versa. Shaft 11 is connected to a pump coupling ring 17, in some embodiments. Some of these embodiments couple the shaft 11 to wear plates 18. Further embodiments couple the shaft 11 to a thrust plate 19. In some examples, the thrust plate 19 retains the bearing 15. Some examples include a needle roller bearing 14 to add alignment and stability to the assembly. Some examples retain parts with fasteners such as screws into one assembly. In some examples, housing 20 and nut 21 hold the assembly together to resist high pressure forces from oil in operation urging the assembly apart.

In one mode of operation, the couple 300 releases vanes 7 on the spinning shaft resulting in the vanes 7 working a fluid to pump fluid. However, fluid escape from a pump chamber is resisted, such as by forcing the fluid against a relief valve calibrated to a predetermined pressure such as a high pressure. It should be noted that since little pumping occurs, part wear is less of a concern than in a vane pump. In some examples, resistance to input energy is transmitted to an output shaft 11. In some examples, the energy supplied is equal to, or substantially equal to in the case of some leakage, the pressure of the oil and the displacement of the ring. In this configuration, torque=pressure*displacement/2*Pi.

Figure 5:
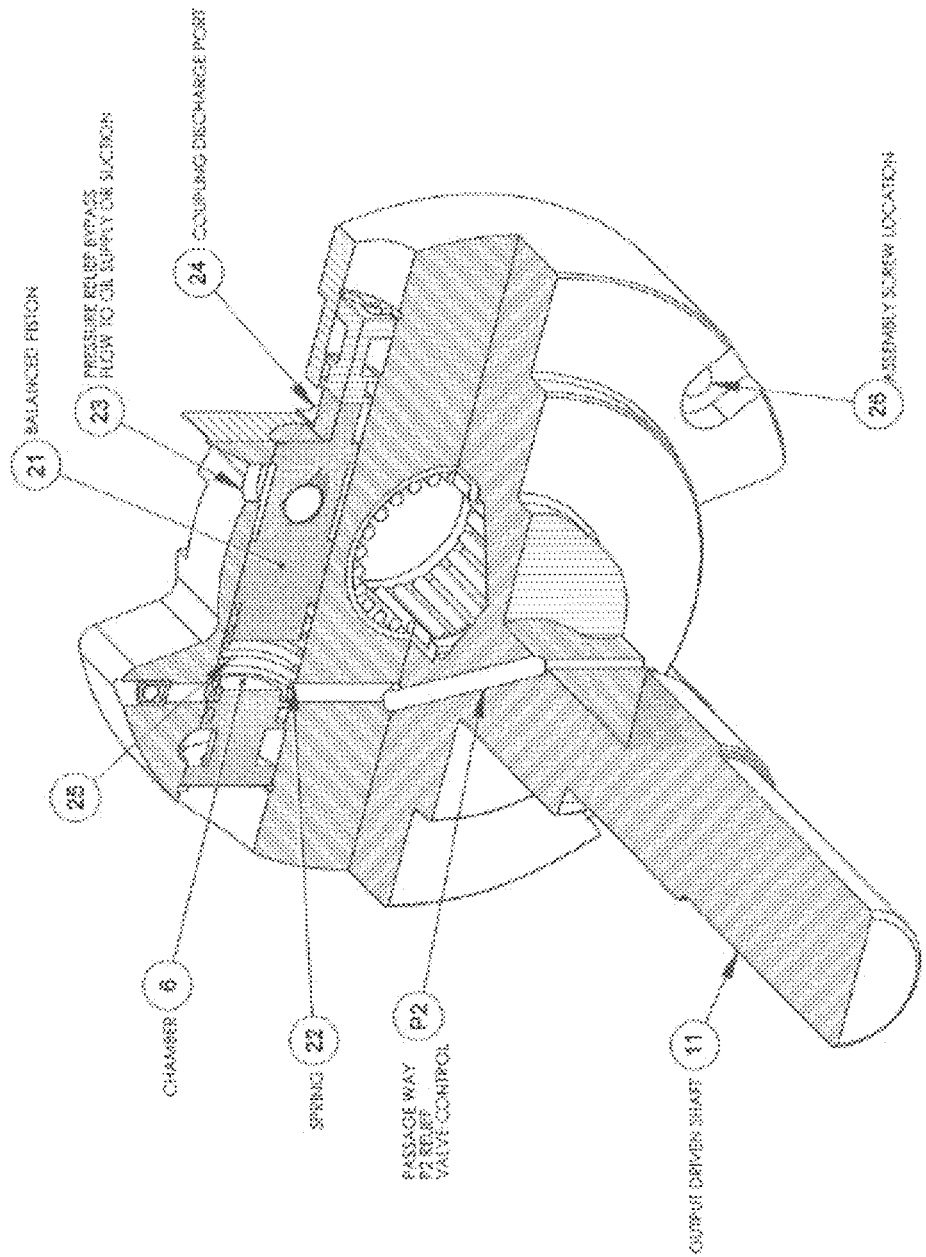
FIG. 5 is a partial cross section view of a balance piston of the couple of FIG. 3A taken along the line 5-5.
Figure 6:
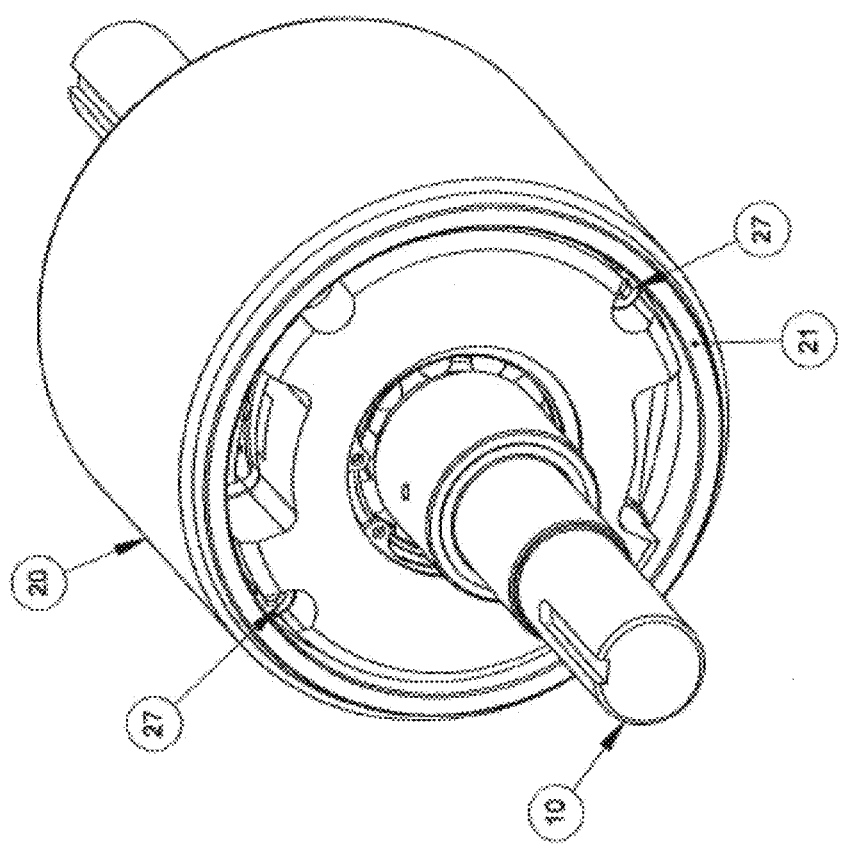
FIG. 6 is perspective view of a portion of an input and output of the couple of FIG. 2.

Port 3 in some examples provides remote control of a safety pressure relief valve, such as one positioned in bore 6. Referring to FIG. 5, control of pressure in the couple 300 is effected by controlling the balanced piston 21 situated in chamber 6. In various examples, the balance piston 21 prevents uncontrolled free flow of fluid from one or more pump chambers. In some examples, piston 21 is held by spring 22, but the present subject matter is not so limited.

In some examples, to resist the escape of the oil from the coupling, pressure is placed on both ends of piston 21 via port 24 and orifice 25. Such a configuration disposes a small force on the spring to retain the spool in place, closing off oil escaping from the chamber 6 to drain 23. In some examples, remote control of the pressure via passage P2 allows adjustable pressure control or venting/unloading of the piston 21. Other controls are possible. In some examples, by the oil force pushing spool 21 against spring 22, the system allows fluid to escape from port 24 to drain port 23. In some examples, port 23 is at a lower pressure to provide suction. In some examples, the remote pressure control is adjustable up to 2000 pounds per square inch (13.8 MPa). In some examples, the remote pressure control is provided via a 0.75 millimeter orifice.

In various examples, the input drive shaft 10 converts energy into a hydraulic force that is resisted by the forces on shaft 11. This hydraulic force is generated from the fluid trapped by the vanes working the fluid against the rotor contained by the ring, pressure plates and thrust plates causing shaft 11 to rotate.

The present subject matter provides a compact couple. In some examples, a 100 horsepower coupling has a diameter nominally of 6 inches (15.2 cm), which is smaller than a comparable plate of a clutch or low pressure fluid coupling such as a torque converter. The present subject matter does not suffer from clutch burn out. At stall, the coupling is able to discharge over a safety pressure relief valve preventing "burn-out" or damage to machines coupled to one or both of the input and the out. The present embodiments are efficient as the incorporate selected manufacturing tolerances that result in efficiencies higher than conventional fluid couplings such as a torque converter that require loose engineering tolerances for reliability.

Figure 7:
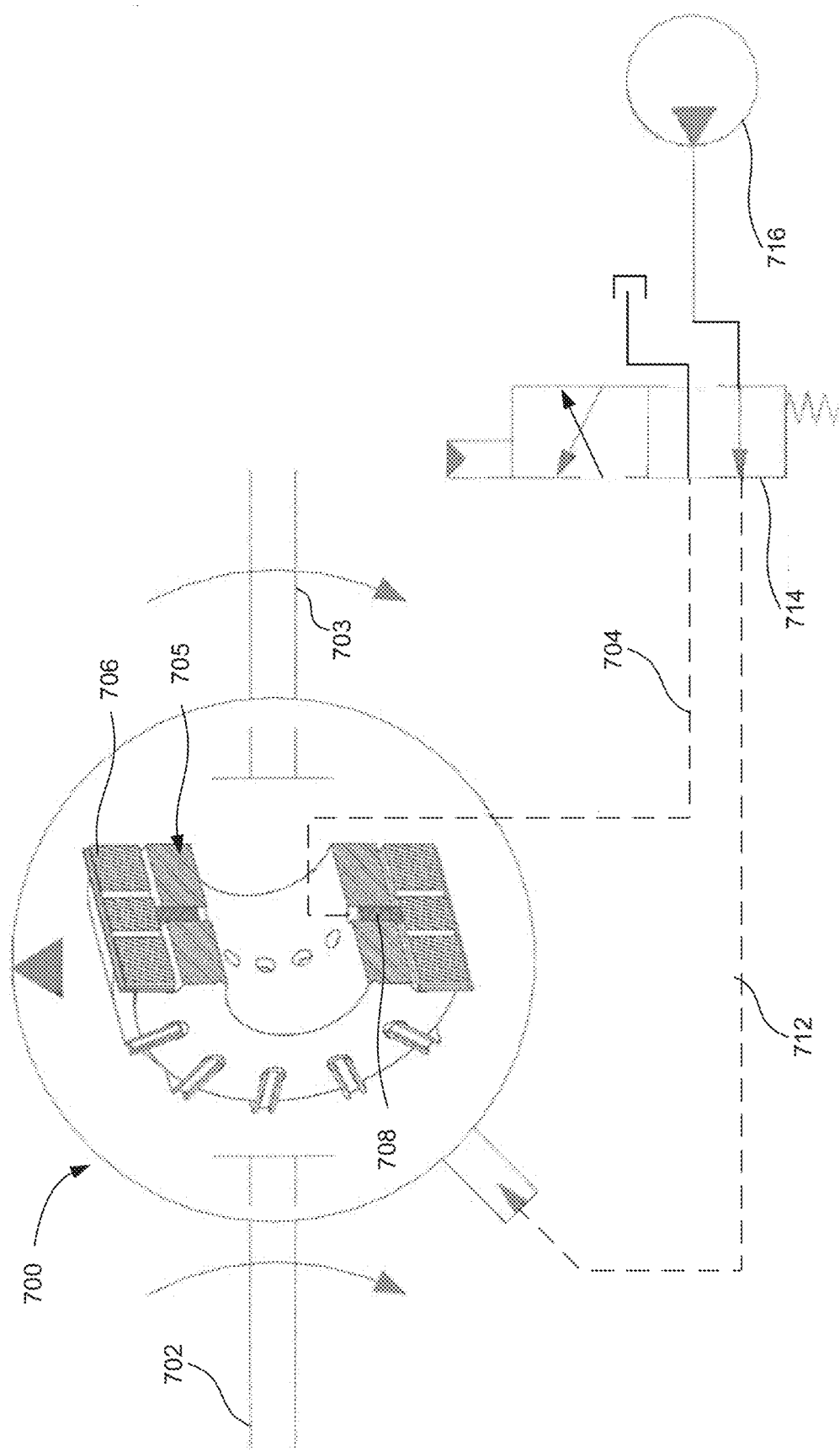
FIG. 7 is a schematic of a hydraulic couple including a cross-section view of a rotating group including pins to extend and retract vanes, according to some examples.

FIG. 7 is a schematic of a hydraulic couple 700 including a cross-section view of a rotating group including pins to extend and retract vanes, according to some examples. A rotating group 705 includes working surfaces 706 (e.g., the illustrated vanes) that are aided by a fluid pressure assist signal 704 to extend away from the rotating group to meet a body coupled to the output 703. The fluid pressure assist can supply all of the force needed to extend the working surfaces 706, or a portion, with a remainder supplied by an inertial force experienced during high speed rotation of the input 702. In some examples, pin 708 is coupled to or against an inner side of the working surface 706 to urge the working surface 706 against a body coupled to an output shaft 703. In various embodiments, an inlet signal 712 is added to control the extraction or retraction of an retainer to lock one or more working surfaces 706 in a retracted position, or to unlock the retainers so that they can extend.

Some examples include a valve 714 to control pressurization of one or more assist signals 704 to extend pins 708. In the illustrated mode, the valve is adjusted to depressurize the assist signal 704, such as through leakage or direction to a drain, such that the working surfaces are be retracted and locked with and inlet signal 712. In a second mode, the valve 714 is adjusted to depressurize the inlet signal 712 such as through leakage or a drain, and to use an assist pressure source 716 to pressurize an assist signal 704 to press fluid against a pin 708 to urge the working surface 706 outward to meet a body coupled to output shaft 703 thereby urging the working surface 706 to work a fluid disposed between the rotating group 705 and the body.

Figure 8B:
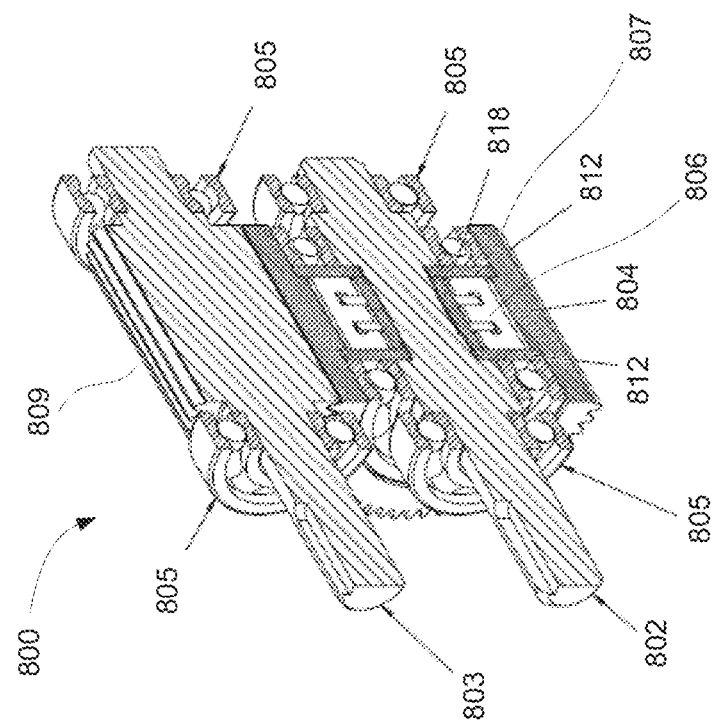
FIG. 8B is a cross section taken along line 8B-8B in FIG. 8A.
Figure 8A:
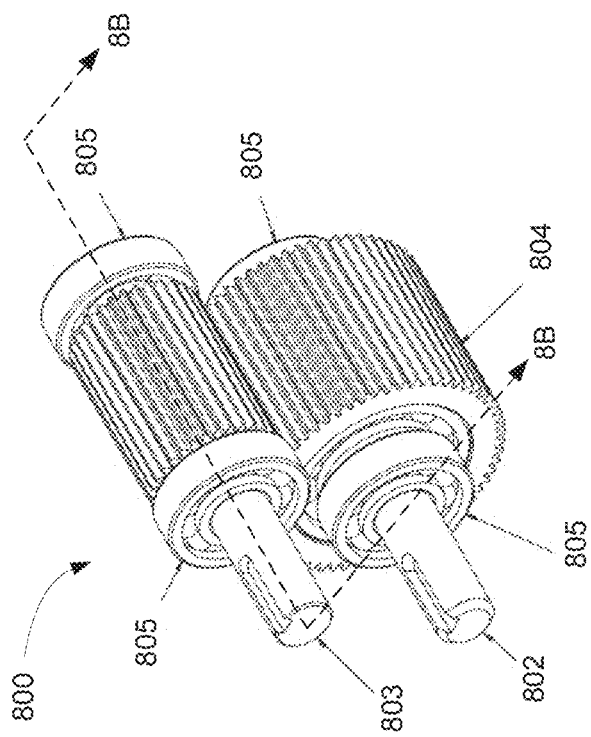
FIG. 8A is a perspective view of a hydraulic couple with a geared body, according to some examples.

FIG. 8A is a perspective view of a hydraulic couple with a geared body, according to some examples. FIG. 8B is a cross section taken along line 8B-8B in FIG. 8A. In various examples, rotation of an input 802 can be arrested by extending working surfaces 806 to work hydraulic fluid against a body 804 that has a surface 807, such as a geared surface, to output power via the surface 807. In the illustrated example, the surface 807 includes gears that interface with another gear surface 809 to rotate the gear surface 809 to turn the output 803.

The gear system 800 is useful in a number of applications. For example, in one application, the input 802 is fixed to an engine to rotate while the engine rotates. The output 803 is optionally coupled to a supercharger to rotate rotators of the supercharger. In various examples, providing a pilot signal to allow the working surfaces 806 to work a hydraulic fluid against the body 804 causes a hydraulic resistance between the two, resulting in rotation of the body 804 in synchrony with the surface 809 to turn the output 803. In this manner, the supercharger can be activated and deactivated with the provision of a pilot signal. Devices such as a valve are used to switch to provide intake air while the supercharger is deactivated in various examples.

Accordingly, one benefit is that the gear system 800 can be activated and deactivated. In moments when the gears are not used, such as in automotive transmission embodiments in which only some gears are used at some times, gear rotation can be substantially slowed or stopped, which can improve efficiency by reducing or eliminating windage losses attributable to the rotation of the gear system 800 such as in an oil bath.

FIG. 9 is a table showing experimental figures related to a first operating condition. The table illustrates the power required to drive a fan using a gear pump to gear motor topology, using a pressure compensated piston pump to gear motor topology and using embodiments of a coupling as disclosed herein. In some of these examples, an input shaft is coupled to rotating member of a machine such as a crankshaft, and when a signal is provided, retainers release working surfaces such as vanes so that they can work fluid to lock the couple to turn the output shaft to turn a fan blade. The gear pump/gear motor design shows that at full speed, a large amount of power is used due in part to inefficiency. It should also be noted that the system has to be sized to operate all the time, thereby wasting power when fan cooling is not needed. In FIG. 10, the performance of the three topologies are illustrated at half fan speed. Such a condition is possible by regulating the pressure supplied to the couple so that the pressure causes the couple to act as a motor or a pump, in essence rotating the fan attached to the output faster or slower than the rotation of input. The experimental results show that the coupling embodiment is nearly as efficient as the piston embodiment. In FIG. 11, the coupling embodiment is more efficient than the other topologies, due to the improvements discussed herein.

The present subject matter benefits from precise control. In some embodiments, programmable torque settings effected by adjustment of the pressure relief setting result in a predetermined stall points. Such a programmable stall point can be either fixed or remotely by associating the relief valve setting with a remote conventional override relief valve. A further benefit is controlled acceleration or deceleration by varying relief valve settings to match desired maximum torques. In such embodiments, start and stop torques can be reduced to limit high peak torque levels that can damage machinery.

Figure 12:
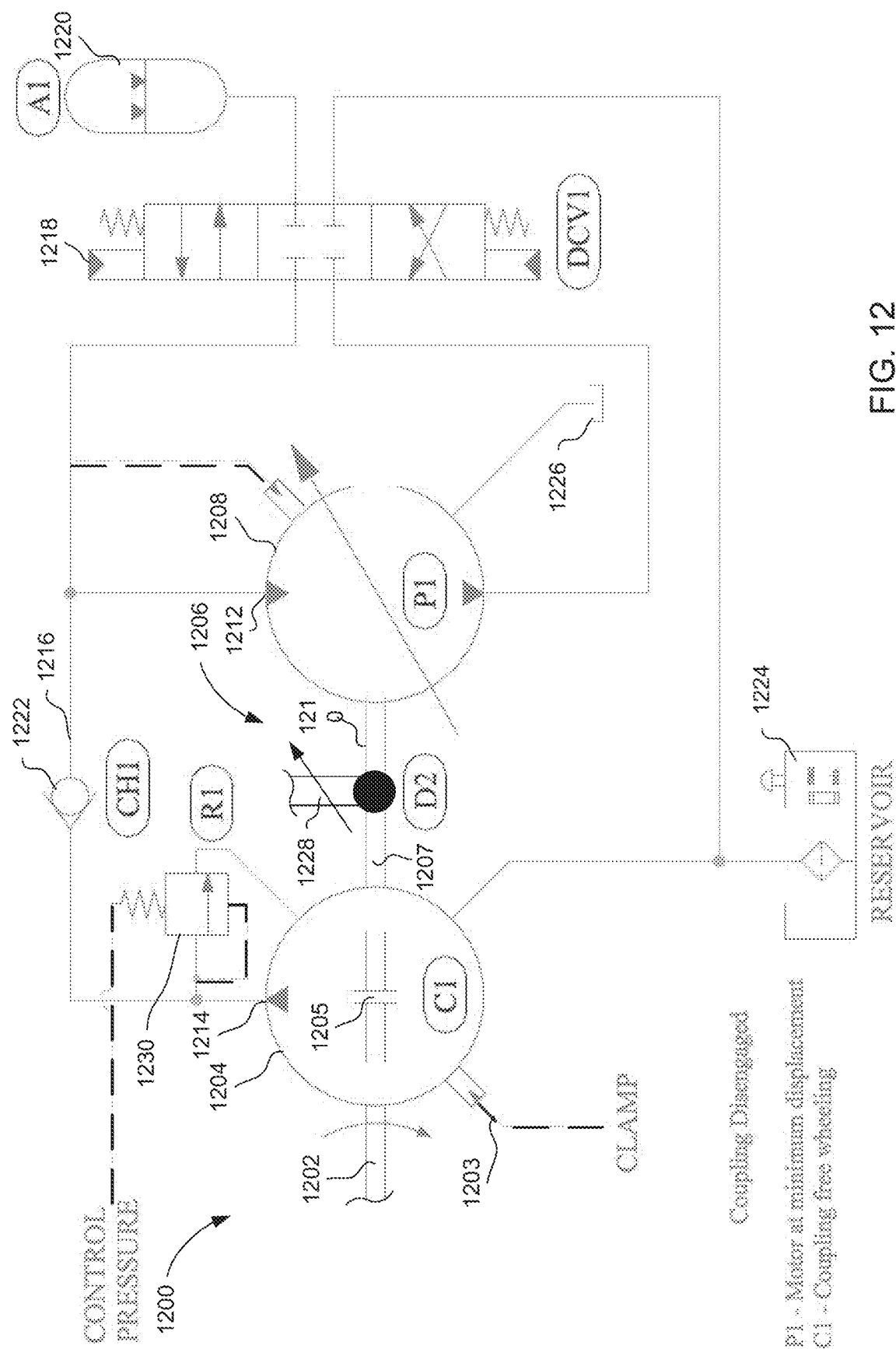
FIG. 12 illustrates a torque amplifier in a couple disengaged of operation, according to some embodiments.

FIG. 12 illustrates a torque amplifier in a couple disengaged of operation, according to some embodiments. Various embodiments include a torque source 1202. The torque source can be any source including, but not limited to, engines such as diesel engines, and electric motors. In some examples, the torque source is a variable speed torque source that is intended to run at different speeds in operation. Examples include diesel engines used to move vehicles such as over the road trucks, off road vehicles, and trains. In additional embodiments, the torque source 1202 is intended to run at a constant speed in operation, such as an industrial induction motor.

Various embodiments include a hydraulic couple 1204 to couple the torque source 1202 to powertrain 1206. One example of a hydraulic couple is illustrated in FIGS. 25-27, but the present subject matter is not so limited and extends to other hydraulic couples disclosed herein. As disclosed herein, the hydraulic couple 1204 includes retainers to retain working surfaces that would, in an unretained mode, work 1205 hydraulic fluid through the couple. In various examples, a pilot signal 1203 is used to control the retainers. The system 1200 includes hydraulic pump motor 1208 such as a digitally controlled piston pump. The pump motor 1208 can be controlled by various methods including, but not limited to, electronically, pressure compensated, lever, or digitally. The pump 1208 includes an output shaft 1210 coupled to the powertrain 1206, the hydraulic pump including a pump motor inlet 1212 in fluid communication with the discharge pressure 1214 of the hydraulic couple 1204, the pump motor 1208 to receive fluid 1216 from the discharge pressure 1214 of the hydraulic couple 1204 to propel the output shaft 1210.

Various examples include a valve 1218 to control operation of the system 1200. An optional accumulator 1220 can store pressurized fluid. An optional shuttle valve 1222 ensures one-way flow of the fluid 1216 in some examples. Some examples include a reservoir to store fluid. A drain 1226 optionally returns to the reservoir 1224 or to another fluid storage device.

In various examples, the powertrain 1206 includes a transmission 1228. There are several benefits of the system 1200 as it relates to transmissions. In FIG. 12, the couple 1204 is configured to allow the input 1202 to spin with respect to the output shaft 1207. This is equivalent to a neutral condition for the vehicle. The pump 1208 can be stroked on slightly or fully in this condition; the degree of stroke is inconsequential as there is little inlet pressure.

Figure 13:
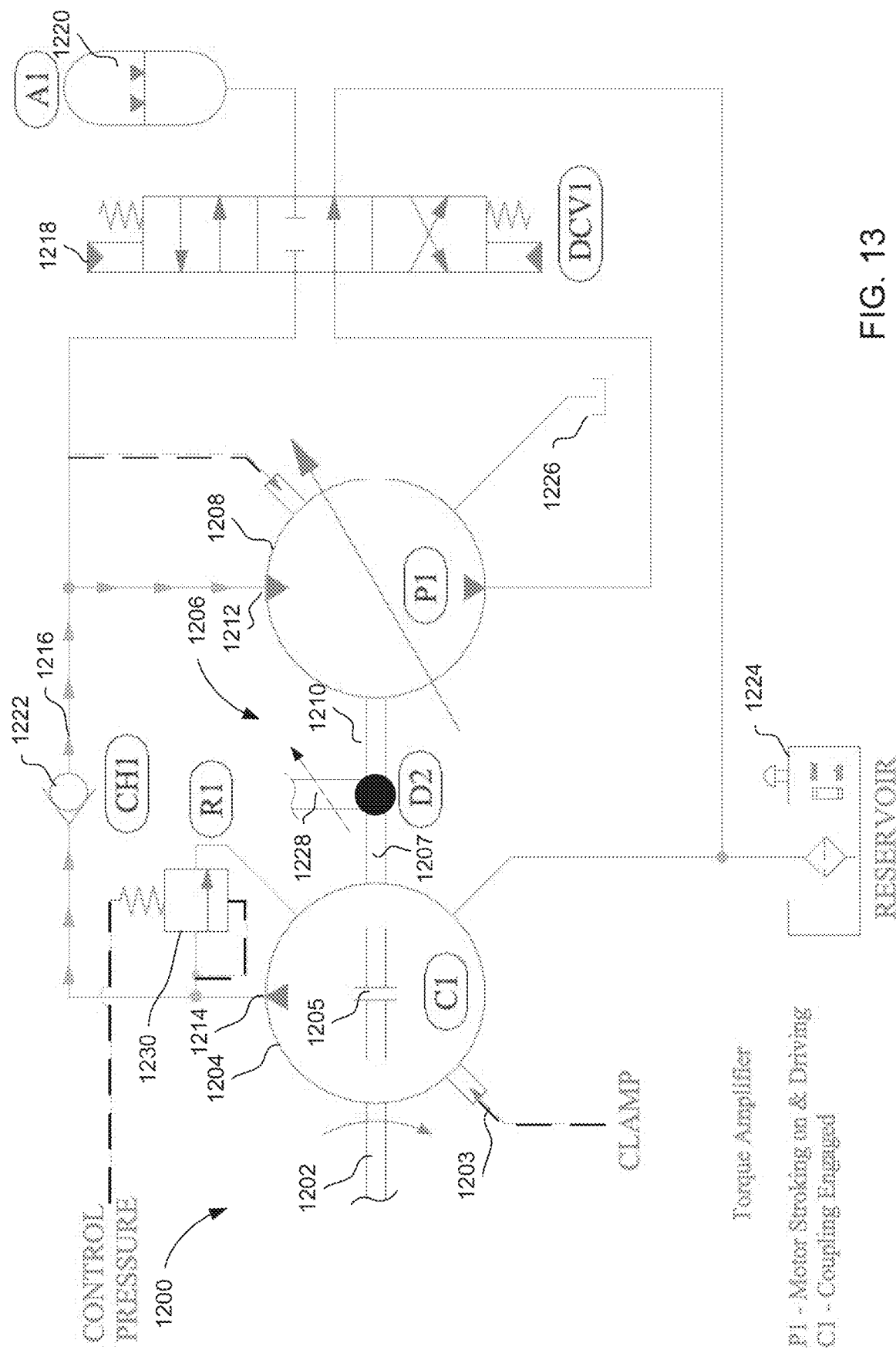
FIG. 13 illustrates a torque amplifier in an driving mode of operation, according to some embodiments.

FIG. 13 illustrates a torque amplifier in a driving mode of operation, according to some embodiments. The illustrated mode of operation correlates to a steady state driving condition. Torque to the input shaft 1202 is transmitted to the output shaft 1207 with few or no losses; the couple 1204 effectively works as a mechanical shaft. The relief valve 1230 allows the couple 1204 to slip should a problem occur, in a manner that a clutch might slip. In additional embodiments, the relief valve 1230 is used to control the torque output magnitude of the couple 1204.

In arriving at the state illustrated in FIG. 13, a number of beneficial operations occur. In some examples, before a first gear is selected, a torque source 1202 such as an engine is spinning such as at 1500 rpm. As the first gear is selected, such as via positioning the transmission 1228 into a first gear, the hydraulic couple releases working surfaces such as vanes so that the hydraulic couple 1204 pumps against a fluid 1216. Provided the valve 1218 is so adjusted, the hydraulic couple 1204 begins to pump fluid 1216 to the pump 1208. The pump receives fluid 1208 and strokes on gradually to begin to move the powertrain 1228. After a steady state is reached, if a boost of torque is required, the system can again introduce hydraulic motor torque through 1210 on top of the torque the engine produces through 1207.

In some examples, after a steady state driving mode is reached, the valve 1218 selects to resist pumping by the couple 1204. The couple 1204 essentially locks except for any leakage, and the pump 1208 strokes off. In this mode, the input 1202 is locked to the output 1207 and thereby to the transmission 1228 and the inefficiencies of the hydraulic system are substantially reduced or eliminated. Further, the risk of damaging the motor pump 1208 is reduced.

Accordingly, several benefits are realized including reducing peak transient forces experienced by the transmission 1228. The peak transient forces are reduced by the couple 1204 separating the engine from the transmission 1228 and the pump 1208 gradually adding them back to the transmission 1228. Because of the adjustability of the system, the vehicle can operate with a simpler transmission that includes fewer speeds. Such transmissions are less expensive, are easier to repair, are lighter, and because they have less complexity, are less likely to break.

Figure 14:
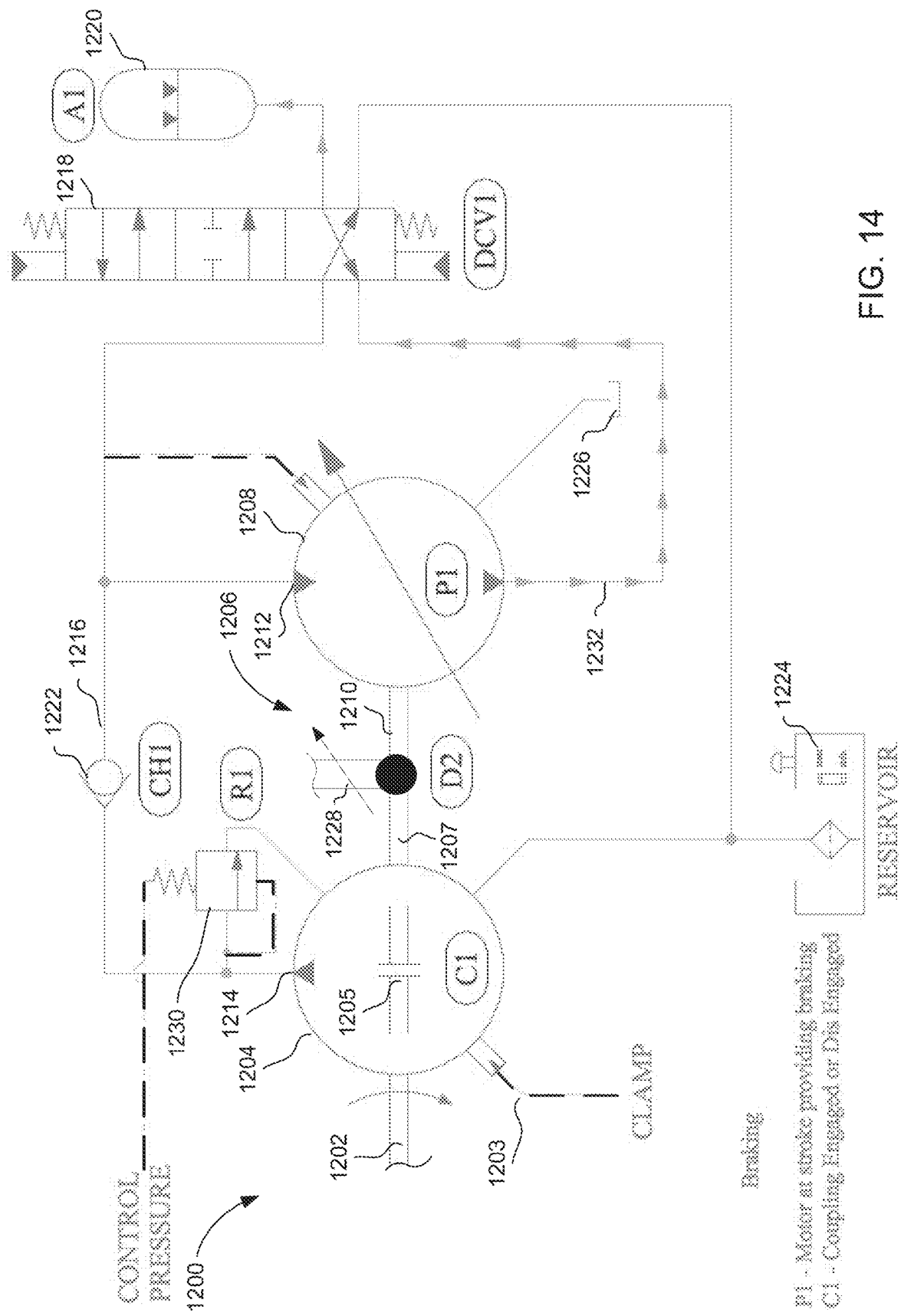
FIG. 14 illustrates a torque amplifier in a braking mode of operation, according to some embodiments.

FIG. 14 illustrates a torque amplifier in a regenerative braking mode of operation, according to some embodiments. In this embodiment, the couple can be engaged or disengaged. The pump motor 1208 is stroked to a pumping mode to direct fluid generated during vehicle deceleration into the accumulator 1220. If the accumulator is full, the pump can be used to force fluid over a relief valve, or it can optionally be stroked off of pumping. In various examples, wheel brakes are used to assist in stop. In some additional examples, the couple 1204 is engaged to allow for engine braking.

Figure 15:
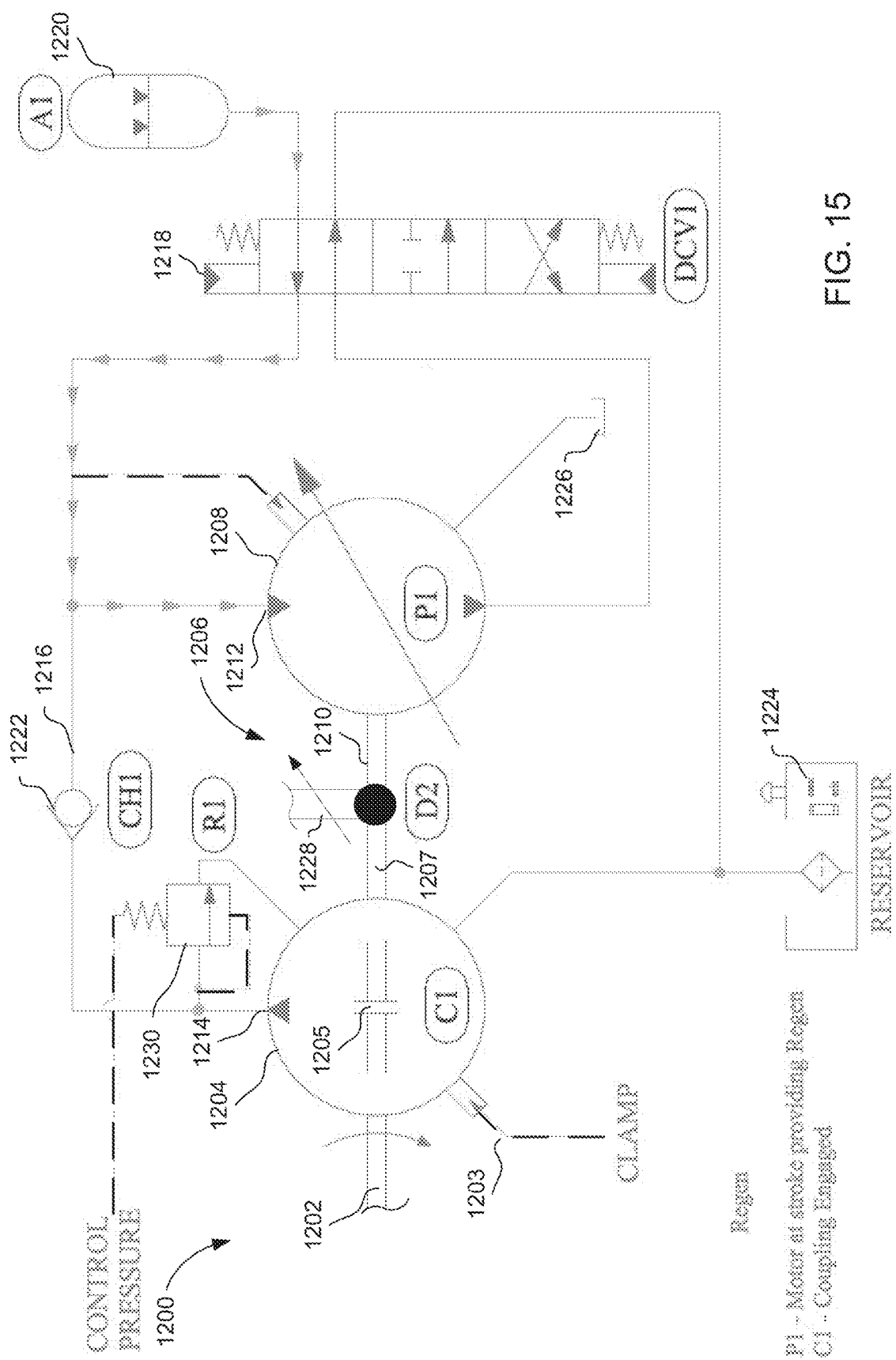
FIG. 15 illustrates a torque amplifier in a regenerative braking mode of operation, according to some embodiments.

FIG. 15 illustrates a torque amplifier in a regenerative braking mode of operation, according to some embodiments. In this example, energy stored in the accumulator 1220, such as energy stored during deceleration of the vehicle, is used to accelerate the vehicle. The valve 1218 is adjusted and the pump motor is stroked to a motor mode to propel the vehicle. In this mode, the coupling 1204 is engaged and pumps fluid until the resistance from the fluid 1216 reaches a magnitude to substantially lock the couple 1204. The fluid 1216 can reach such a pressure through adjustment of the valve 1218. The fluid 1216 can additionally reach such a pressure when the pump motor 1208 experiences a high resistance to propulsion.

Figure 16:
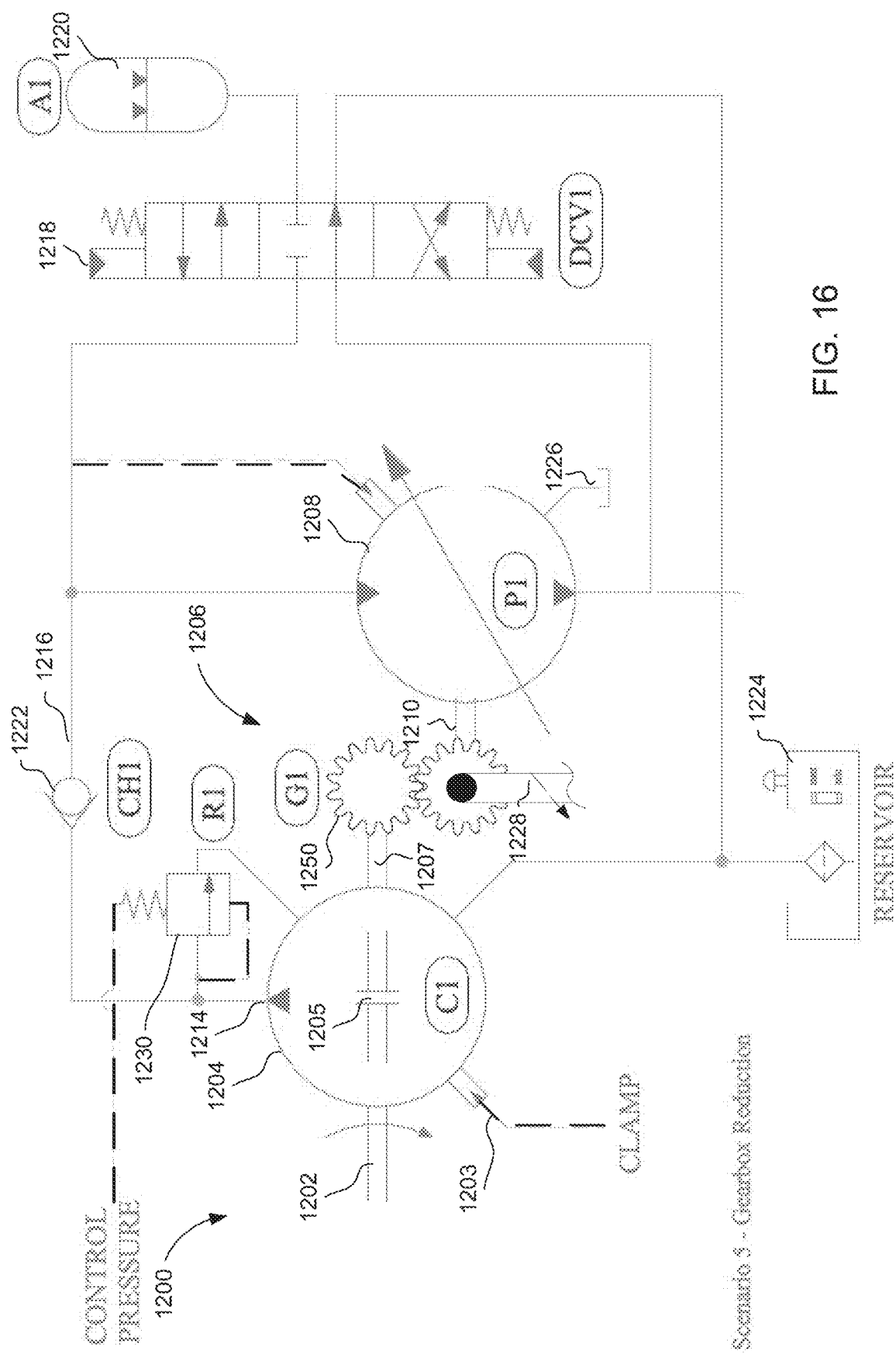
FIG. 16 illustrates a torque amplifier in a first mode of operation, according to some embodiments.

FIG. 16 illustrates a torque amplifier in a first mode of operation, according to some embodiments. This embodiment illustrates an optional gear set 1250 to alter the rotation ratio between the torque source 1202 and the transmission 1228 so that it's a ratio other than 1:1.

Figure 17:
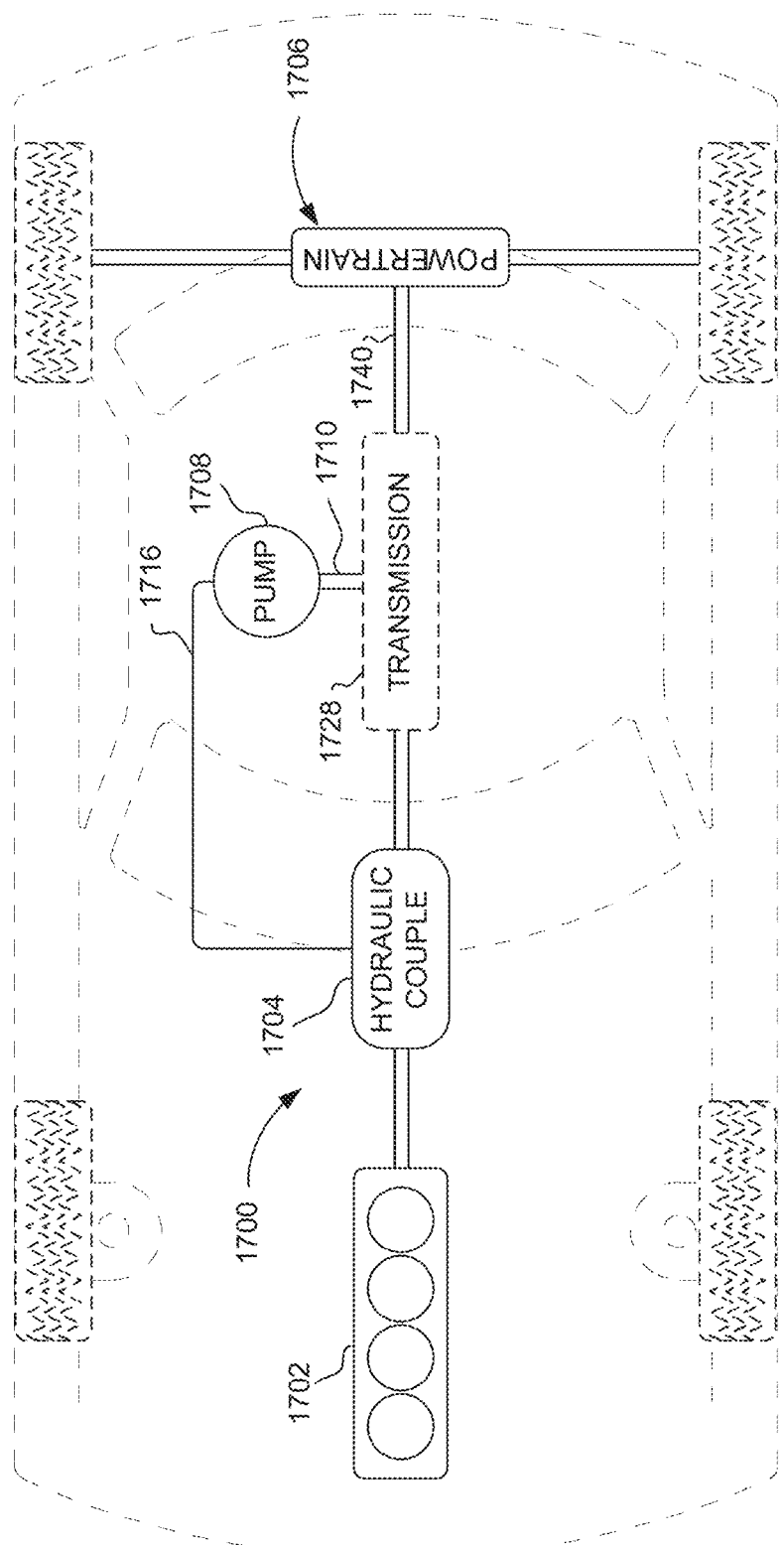
FIG. 17 illustrates a vehicle including a torque amplifier, according to some examples.

FIG. 17 illustrates a vehicle including a torque amplifier, according to some examples. The illustration represents one possible configuration, and others are possible. By positioning the hydraulic couple 1204 before the transmission, more operational modes are possible than with configurations in which a hydraulic pump or pump motor is downstream 1240, such as when the pump motor is between the transmission 1228 and a differential for an axle.

One benefit of the system 1200 is that the fluid 1216 can optionally be used to drive accessories such as dump boxes. This is an improvement over designs in which a pump 1208 is between a transmission and the remainder of the powertrain because in those systems, the vehicle would have to be moving in order to provide pumped fluid to drive an accessory. In the present examples, a valve can allow the couple to pump fluid to drive an accessory. Another benefit of the system 1200 is that in a steady state driving mode the system does not emit hydraulic noise, sparing the operator from listening to what is often regarded as an unpleasant noise.

Figure 18:
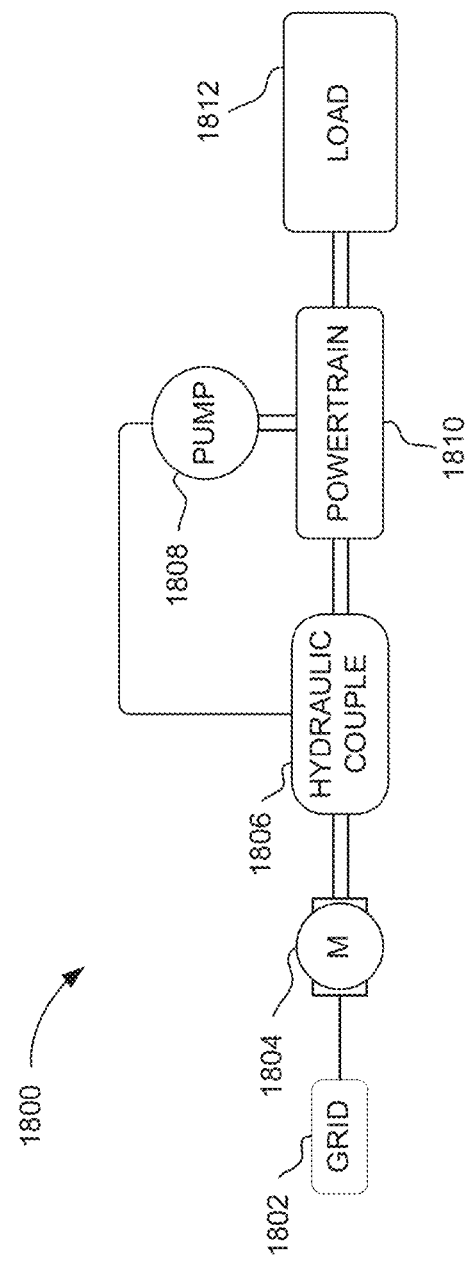
FIG. 18 illustrates a load ultimately driven by an electrical motor, according to some embodiments.

FIG. 18 illustrates a load ultimately driven by an electrical motor, according to some embodiments. The system 1800 includes grid power 1802 that is used to power an motor 1804 such as an AC induction motor. The motor 1804 is coupled to the hydraulic couple 1806 to provide an input torque. As discussed herein, the hydraulic couple 1806 is to cooperate with the pump 1808 to gradually introduce torque to the powertrain 1810, thereby working the load 1812. Such a configuration reduces the complexity of the system 1800 when compared to designs using a gearbox or a larger, more expensive multi-speed motor.

Figure 19F:
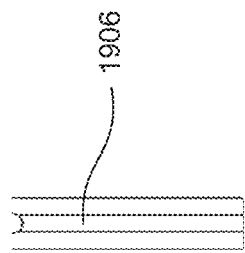
FIG. 19F is a perspective view of FIG. 19B, cross-sectioned at line 19F-19F.
Figure 19G:
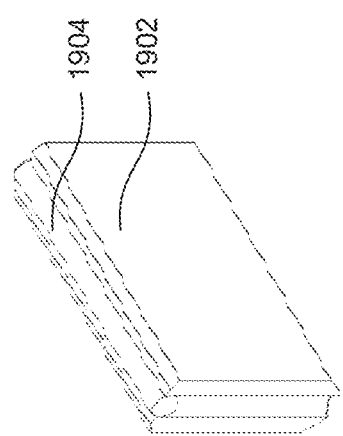
FIG. 19G is a bottom view of FIG. 19F.

FIG. 19A is a perspective view of a vane including a roller tip, according to an example. FIG. 19B is a bottom view of FIG. 19A. FIG. 19C is a top view of FIG. 19A. FIG. 19D is a front view of FIG. 19A. FIG. 19E is a side view of FIG. 19A. FIG. 19F is a perspective view of FIG. 19B, cross-sectioned at line 19F-19F. FIG. 19G is a bottom view of FIG. 19F. A vane 1902 includes a journal 1903 in which a vane 1904 is disposed. In some optional configurations, a port 1906 extends from the bottom of the vane to the journal 1903 to provide hydraulic fluid to the vane, such as to lubricate it, to balance it in a vane pump and/or to provide a hydrodynamic bearing to support the vane 1904.

The present detailed description refers to subject matter in the accompanying drawings that show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The present detailed description is, therefore, not to be taken in a limiting sense, and the scope is defined only by the appended claims, along with the full scope of legal equivalents to which such claims are entitled.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A system for a vehicle, the system comprising:
   a hydraulic coupling comprising:
   a rotor disposed for rotation about an axis;
   a plurality of vanes each moveable relative to the rotor between a retracted position and an extended position where the plurality of vanes work a hydraulic fluid introduced adjacent the rotor, wherein each of the plurality of vanes has an outer tip with a recess therein;
   a roller mounted at the outer tip of each of the plurality of vanes at least partially positioned within the recess; and
   a ring disposed at least partially around the rotor;
   an input shaft and an output shaft coupled to rotate together by the hydraulic coupling in a vane extended mode of operation, and the input shaft and output shaft are free to rotate with respect to one another in a vane retracted mode of operation; and
   an accumulator configured to store pressurized fluid.

2. The system of claim 1, wherein the hydraulic coupling is configured to retain the plurality of vanes in the retracted position within the rotor and is configured to release the plurality of vanes from the rotor to the extended position.

3. The system of claim 1, further comprising a hydraulic pump motor coupled to the output shaft, the hydraulic pump motor including a pump motor port in fluid communication with the hydraulic coupling configured to selectively deliver an amount of fluid at a discharge pressure, the pump motor receives fluid from the hydraulic coupling to propel the output shaft in the vane extended mode of operation.

4. The system of claim 3, wherein the hydraulic pump motor comprises a digitally controlled piston pump.

5. The system of claim 3, wherein the pump motor is configured to operate to pump pressurized fluid generated during vehicle deceleration to the accumulator in a regenerative braking mode of operation for the vehicle.

6. The system of claim 3, wherein the pressurized fluid stored in the accumulator is used by the pump motor to accelerate the vehicle.

7. The system of claim 3, wherein the pump motor is configured to be stroked at least one of partially or fully when the vehicle is in a neutral condition.

8. The system of claim 3, further comprising:
   a torque producer coupled to the input shaft; and
   a powertrain coupled to the output shaft, wherein the hydraulic motor pump strokes on to move the powertrain in a drive mode of operation for the vehicle.

9. The system of claim 1, further comprising a relief valve that controls a torque output magnitude of the coupling.

10. The system of claim 1, wherein the coupling is configured to act as a mechanical shaft to lock the input shaft to the output shaft and the pump motor strokes off when the vehicle is in a steady state driving mode of operation.

11. The system of claim 1, wherein the motor pump is configured to boost torque on the output shaft.

12. A method comprising:
provided a hydraulic device configured as both a coupling and a vane pump, wherein the hydraulic device has a plurality of vanes that are extendable from and retractable in a rotor, and wherein a tip of each of the plurality of vanes includes a roller bearing; and
flowing a pressurized hydraulic fluid from the hydraulic device to an accumulator.

13. The method of claim 12; further comprising coupling a pump motor selectively with the hydraulic device.

14. The method of claim 13, comprising flowing the pressurized hydraulic fluid from the hydraulic device to the pump motor.

15. The method of claim 13, comprising bleeding pressure generated by the vane pump over a relief valve when the accumulator is full.

16. The method of claim 13, comprising driving, after the regenerative braking mode, the load with the vane pump using hydraulic pressure stored in the accumulator.

17. The method of claim 12, comprising storing the pressurized hydraulic fluid in the accumulator in a regenerative braking mode.

18. A vehicle system comprising:
a hydraulic coupling having a body and at least a first vane configured for movement relative to the body, the hydraulic coupling adapted to retain the first vane in a retracted vane mode of operation and to release the first vane in a vane extended mode of operation in which the first vane extends to meet the body to hydraulically work fluid when the first vane is moved with respect to the body;
an input shaft and an output shaft coupled to rotate together by the hydraulic coupling in the vane extended mode of operation, and the input shall and output shaft are free to rotate with respect to one another in the vane retracted mode of operation;
an accessory configured to operate as a pump in one operation mode to pump a pressurized fluid;
a torque producer coupled to the input shaft; and
an accumulator configured to store pressurized fluid.

19. The system of claim 18, further comprising a transmission coupled to the output shaft, wherein the coupling is disposed between the torque producer and the transmission and is in fluid communication with and drives the accessory in the vane extended mode of operation.

20. The system of claim 18, wherein the accessory comprises a motor pump.

* * * * *

UNITED STATES PATENT AND TRADEMARK OFFICE
CERTIFICATE OF CORRECTION

PATENT NO. : 11,168,772 B2  
APPLICATION NO. : 16/867943  
DATED : November 9, 2021  
INVENTOR(S) : Mathers Page 1 of 1

It is certified that error appears in the above-identified patent and that said Letters Patent is hereby corrected as shown below:

On the Title Page

On page 5, in Column 2, item (56) under "Other Publications", Line 4, delete "Sep." and insert --Apr.-- therefor On page 5, in Column 2, item (56) under "Other Publications", Line 33, delete "Respose" and insert --Response-- therefor On page 5, in Column 2, item (56) under "Other Publications", Line 54, after "Sep.", insert --20,--

On page 6, in Column 1, item (56) under "Other Publications", Line 6, delete "Srial" and insert --Serial-- therefor In the Claims In Column 13, Line 9, in Claim 13, delete "12;" and insert --12,-- therefor In Column 14, Line 9, in Claim 18, delete "shall" and insert --shaft-- therefor Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*